United States Patent
Lindenmeier et al.

(10) Patent No.: US 6,633,258 B2
(45) Date of Patent: Oct. 14, 2003

(54) DIVERSITY SYSTEM FOR RECEIVING DIGITAL TERRESTRIAL AND/OR SATELLITE RADIO SIGNALS FOR MOTOR VEHICLES

(75) Inventors: Heinz Lindenmeier, Planegg (DE); Jochen Hopf, Haar (DE); Leopold Reiter, Gilching (DE); Michael Daginnus, Braunschweig (DE); Rainer Kronberger, Höhenkirchen (DE)

(73) Assignee: FUBA Automotive GmbH & Co KG, Bad Salzdetfurth (DE)

( * ) Notice: Subject to any disclaimer, the term of this patent is extended or adjusted under 35 U.S.C. 154(b) by 0 days.

(21) Appl. No.: 10/090,061

(22) Filed: Mar. 1, 2002

(65) Prior Publication Data

US 2002/0154059 A1 Oct. 24, 2002

(30) Foreign Application Priority Data

| | | |
|---|---|---|
| Mar. 2, 2001 | (DE) | 101 10 154 |
| Sep. 13, 2001 | (DE) | 101 45 202 |
| Feb. 15, 2002 | (DE) | 102 06 385 |

(51) Int. Cl.$^7$ .............................. H01Q 3/02; H01Q 3/12
(52) U.S. Cl. ................................... 342/374; 455/277.2
(58) Field of Search .................. 342/374; 455/277.2, 455/277.1

(56) References Cited

U.S. PATENT DOCUMENTS

| | | | | |
|---|---|---|---|---|
| 4,566,133 A | * | 1/1986 | Rambo | 455/277 |
| 4,584,709 A | * | 4/1986 | Kneisel et al. | 343/702 |

FOREIGN PATENT DOCUMENTS

| | | |
|---|---|---|
| DE | 36 18 452 A1 | 12/1987 |
| DE | 40 34 548 A1 | 10/1990 |
| DE | 39 26 336 C2 | 2/1991 |
| DE | 40 08 505 A1 | 9/1991 |
| EP | 0 952 625 A2 | 10/1999 |
| EP | 1 041 736 A2 | 10/2000 |

OTHER PUBLICATIONS

Patsiokas, Stellios J. (2001), XM Satellite Radio Technology Fundamentals, SAE Technical Paper Series, SAE 2001 World Congress.

* cited by examiner

Primary Examiner—Theodore M. Blum
(74) Attorney, Agent, or Firm—Collard & Roe, P.C.

(57) ABSTRACT

The invention relates to a diversity reception system for motor vehicles for digitally modulated terrestrial and/or satellite radio signals in the frequency range above 1 GHz. The system includes an antenna arrangement of which the reception signal is supplied to a radio receiver. The antenna arrangement is designed as an antenna system having several individual antennas and several antenna components, and contains a controllable logic switching device. The individual antennas and the several antenna components are positioned on the vehicle so that for discrete switching positions of the controllable logic switch, reception signals that are different in terms of diversity are available at the antenna connection point. A reception level testing device is provided for the comparative determination of the reception level contained in the data flow in the HF-channel with an HF channel bandwidth B. The level testing device is designed so that when initiated by the symbol cycle generated in the receiver and during the simultaneously occurring symbol identification of the received flow of data, the reception level is determined in each case within the shortest possible level testing duration.

27 Claims, 17 Drawing Sheets

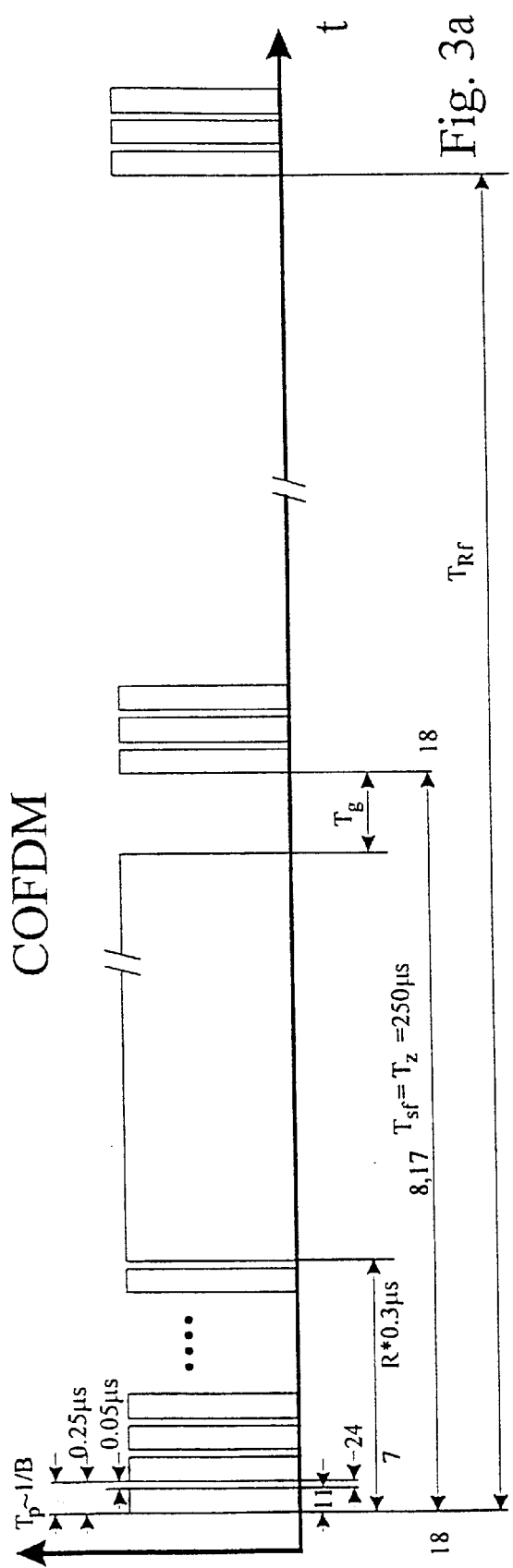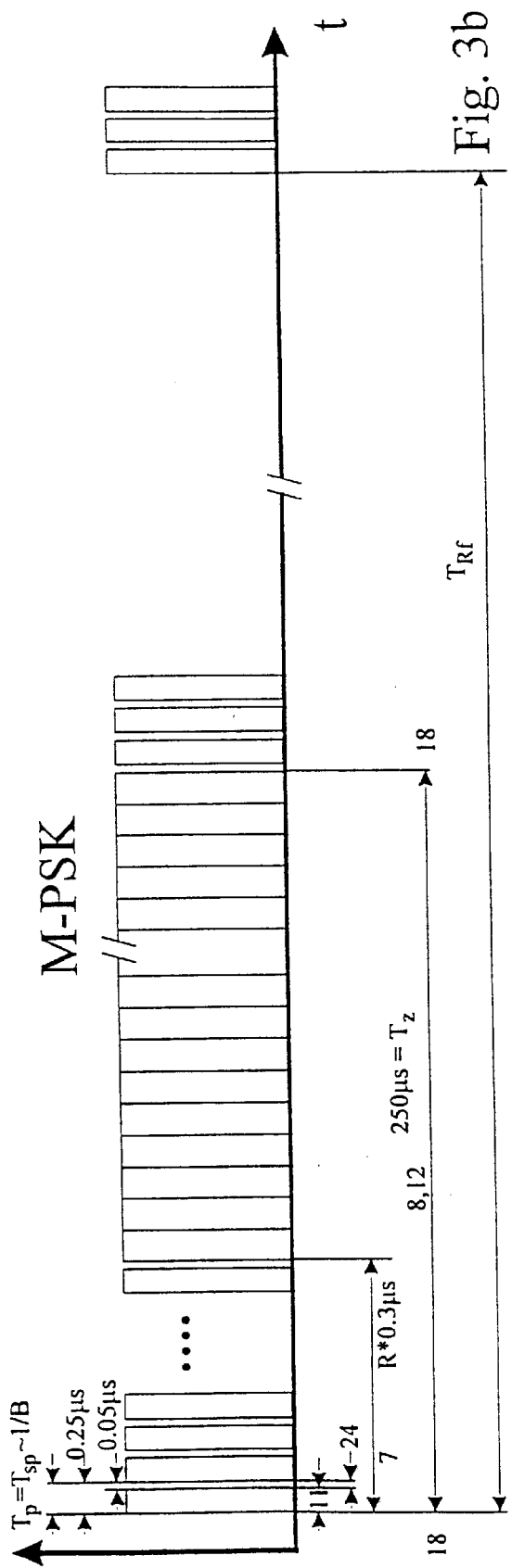

M-PSK

COFDM

DIVERSITY SYSTEM FOR RECEIVING DIGITAL TERRESTRIAL AND/OR SATELLITE RADIO SIGNALS FOR MOTOR VEHICLES

CROSS REFERENCE TO RELATED APPLICATIONS

Applicants claim priority under 35 U.S.C. §119 of German Application Nos. 101 10 154.6, 101 45 202.0 and 102 06 385.0 filed Mar. 2, 2001, Sep. 13, 2001 and Feb. 15, 2002, respectively.

BACKGROUND

This invention relates to a diversity receiving system for digitally modulated terrestrial and/or satellite radio signals in the frequency range above 1 GHz for motor vehicles, with an antenna arrangement whose received signal is supplied to a radio receiver. In particular the OFDM method (orthogonal frequency division multiplex) and the MPSK method (phase shift keying with M phase conditions) are applied for the radio transmission of digital signals in the frequency range above 1 GHz. For the downlink of a satellite radio connection, the QPSK modulation (4 phase conditions) is frequently selected, and for terrestrial communication, the OFDM modulation is selected because the latter has a lower sensitivity with respect to traveling time differences between signals superimposing each other because of multi-way propagation. This also applies to the satellite radio system SDARS, which is designed for the area-covering mobile radio reception in the USA, and for terrestrial radio broadcasts which take place in heavily populated regions or overcrowded areas in addition to the radiation from 2 satellites.

The transmission disturbances occurring due to the multi-way propagation in connection with mobile reception have been successfully drastically reduced over the years with multi-antenna systems for transmitting analog transmitted signals such as, for example in connection with FM radio transmission. These systems are known from German patent P 3618452.7; P 4034548.3; and P 3926336.3. Because of the structure of OFDM or MPSK signals, these systems cannot be used with digital modulation. The present invention is based on European patent EP 1041736 A2. This patent describes and shows in FIGS. 1 and 2a diversity receivers for OFDM signals as prior art, in which, in connection with the transmission of the OFDM burst, preamble signals are transmitted outside of the time slot provided for the data transmission for the synchronization, channel estimation and antenna selection according to a level criterion. This method has the drawback that the time slot for the preamble signal denoted in FIG. 2 by reference numeral 11 has to be provided for, in the antenna selection in the transmitted burst signal. The most favorable antenna signal can be obtained exclusively depending on the occurrence of the burst signal, and not adapted to the necessity of updating, resulting from the driving movement in the multi-way scenario. This is of significance especially at carrier frequencies above 1 GHz. If, deeper level fading events are to be avoided, about ten updating events can be provided over a driving distance amounting to one half wavelength at 1 GHz. The updating then has to be repeated at a speed of 150 km/h at time intervals of 350 µs. For COFDM signals according to the DAB method (digital audio broadcasting) on the L-band (1.5 GHz), this would mean, in the reverse case, of having the unacceptable requirement that the speed of the vehicle be limited to 0.5 km/h.

Furthermore, defining a separate time slot for a preamble signal for the antenna election would lead to a reduction of the effective rate of transmittable data. The invention described in the EP document 1041736 A2 cited above, does not exclusively evaluate the signal level in view of the antenna selection, but provides, as a selection criteria for the antenna selected in connection with the subsequent data identification, additional signal errors that can be derived from a defined, known burst signal, such as, for example traveling time and phase effects. However, in this case, the updating of the antenna selection only takes place in response to the transmitted burst signal, and consequently at large time intervals.

SUMMARY OF THE INVENTION

Therefore, the present invention provides a diversity reception system, in which the received signal is updated in response to the selection of a more favorable received signal with the lowest possible bit error rate, at adequately short time intervals. Moreover, when the vehicle is driving at a high speed, and the data flow is being identified at the same time with a low cost cable link of the radio connection, the bit error rate is kept as low as possible, assuming that a user-friendly antenna is employed from the point of view of current motor vehicle engineering.

The advantage of using the diversity method of the invention is that with respect to the transmitted signals, no measures have to be implemented for using the diversity receiving system on the receiving side. Because of this compatibility, the method can also be used as an addition to a radio system designed for reception with an individual antenna. A further advantage is that the diversity function can also be achieved with only minimal additional expenditure in a receiver intended for reception with a single antenna, because only the intermediate frequency signal, and the symbol cycle signal, which are both available, are required as the minimum requirement that the receiver needs to satisfy. If these two signals are made available on the receiver, the receiving system can be supplemented to obtain an efficient diversity reception system, external of the receiver, by selecting suitable diversity antennas and by a diversity component.

Antennas for receiving systems for the reception of satellite radio signals in motor vehicles are known from German patent DE 40 08 505.8. These antennas are designed as crossed horizontal dipoles, with dipole halves consisting of linear conductor components inclined downwards in the form of a "V". These dipole halves are mechanically fixed in relation to each other at an angle of 90 degrees, and attached to a linear, vertical conductor that is secured on the upper end of a horizontally oriented, conductive base surface. To generate the circular polarization usually required in satellite communications, the two horizontal dipoles inclined downwards in the form of a "V", are electrically wired together via a 90-degree phase network. To receive terrestrially emitted, vertically polarized signals, vertical monopole antennas are provided.

For satellite antennas, an antenna gain of a constant, for example 2 dBi and 3 dBi is strictly required for circular polarization in the elevation angle range of, for example between 25° and, respectively 30 degrees, and 60° and, respectively, 90 degrees depending on the satellite communication system. This requirement has to be satisfied for an antenna that is built up in the center of a plane, conductive base board. With antennas of this type of construction, the antenna gain required in the range of the zenith angle can be generally obtained without problems. As opposed thereto, the antenna gain required in the range of low elevation angles of from 20 to 30 degrees can be realized only with difficulty and can in no case be realized with a very small structural height of the antennas as required for mobile applications. Specifically, it is also impossible for physical reasons to exceed the 3 dBi-values within the entire three-dimensional angle range and to thus realize an increased quality of the signal.

Antennas bent from linear conductors can be used to satisfy the gain requirements both in the angle range of low elevation, and with steep radiation. The form of antenna frequently used at the present time is the quadrifilar helical antenna according to KILGUS (IEEE transactions on Antennas and propagation, 1976, pages 238 to 241). These antennas often have a length of several wavelengths, and are not known in the form of flat antennas with a low structural height. Also, with an antenna with a low structural height as specified in EP 0 952 625 A2, it is not possible to satisfy the gain values specified above in the low elevation angle range.

In the SAE Technical Paper 2001-01-128 with the title "XM satellite Radio Technology Fundamentals" by Stellios J. PATSIOKAS, a helical antenna for the additional reception of terrestrially transmitted signals is combined for that reason with a monopole antenna, resulting in a large size construction of the combined antenna that is not suitable for use on motor vehicles.

A further problem that exists, in addition to the problem of the structural height, arises in conjunction with these antennas from the fact that because of the build-up required in automobile building on the outer surface of the motor vehicle, in conjunction with the impossibility of placing the antenna in the center of the roof for motor vehicle engineering reasons, or because of the frequently raised demand for integrating the antenna in the shape or form of the vehicle, the direction diagram formed in an idealized manner with the prescribed build-up on the surface is very highly deformed if it is attached to the vehicle, and has impermissible intake problems, as a rule. The ranges with low elevation of the radio waves are also frequently affected. The properties of circular polarization of the antenna may be completely lost in this angle range as well. These influences result from the deflections and reflections of the incident waves, which, in the frequency range above 1 to 3 GHz, are often caused on the edges of the vehicle and by the discontinuities of the body of the vehicle such as, for example the roof edge on the rear window, as well as by shading of the wave incidence by parts of the vehicle.

In addition, the received signal evaluated with the directional diagram changes strongly because of reflected waves superimposed on each other due to the movement of the vehicle, which may cause signal cancellations. All of these effects cannot be avoided with an antenna according to the specifications with the help of the build-up of the antenna on a board, and mounted on the vehicle. The impermissibly high bit error rates that result may lead to break-off of the radio connection. By selecting the suitable individual diversity antennas A1, A2, A3, etc. in the antenna system 1 in the diversity reception system as defined by the invention, it is possible to advantageously reduce these effects to a high degree.

Therefore, an important advantage of a diversity reception system as defined by the invention, is the fact that the demand for a single vehicle antenna with a directional diagram with the required circular polarization, such as with an idealized build-up on the prescribed or specified board surface, which cannot be satisfied in practical life, does not have to be separately satisfied for an individual directional diagram of the reception system in the entire three-dimensional angle range, either for the signals transmitted by the satellite or for the terrestrially transmitted signals. By separately realizing the sectoral directional diagrams, which are independent of one another, it is possible, for example to make available a single directional diagram at the selected points in time. This directional diagram has an adequate antenna gain in the required three-dimensional direction, including the small elevation angles that can be otherwise covered only with much difficulty. However, filling up the level fading events of 10 to 20 dB, which are substantial to some extent, over the driving distance, particularly in the area of partial shading, or shading of the directly incident received signals with the help of the diversity reception system as defined by the invention, is distinctly more effective in view of achieving low bit error rates, than meticulously adhering to a prescribed directional diagram on a circular board.

Other objects and features of the present invention will become apparent from the following detailed description considered in connection with the accompanying drawings which disclose at least one embodiment of the present invention. it should he understood, however, that the drawings are designed for the purpose of illustration only and not as a definition of the limits of the invention.

BRIEF DESCRIPTION OF THE DRAWINGS

In the drawings, wherein similar reference characters denote similar elements throughout the several views:

FIG. 3a is a plot of the COFDM modulation signal;

FIG. 3b is a plot of the M-PSK modulation signal;

FIG. 10b shows a sectional view of the antenna system of FIG. 10a.

DETAILED DESCRIPTION

The present invention is explained in greater detail in the following example of a satellite radio reception system supported by the terrestrial transmission of the same signal content for motor vehicles at the carrier frequency "f" of about 2.3 GHz. In this frequency range, the free-space wavelength λ=12 cm. As opposed to terrestrial radio systems in the meter wave range, signals superimposing a direct signal at this frequency with great differences in the traveling time, have a low intensity, so that the major part of these signals is composed of reflections in the closer environment. The transmission bandwidth of the transmission channel between the transmitting antenna and the receiving antenna, which is conditioned the multi-way propagation, consequently has to be estimated to be greater than 10 MHz in most cases.

Figure 1A:
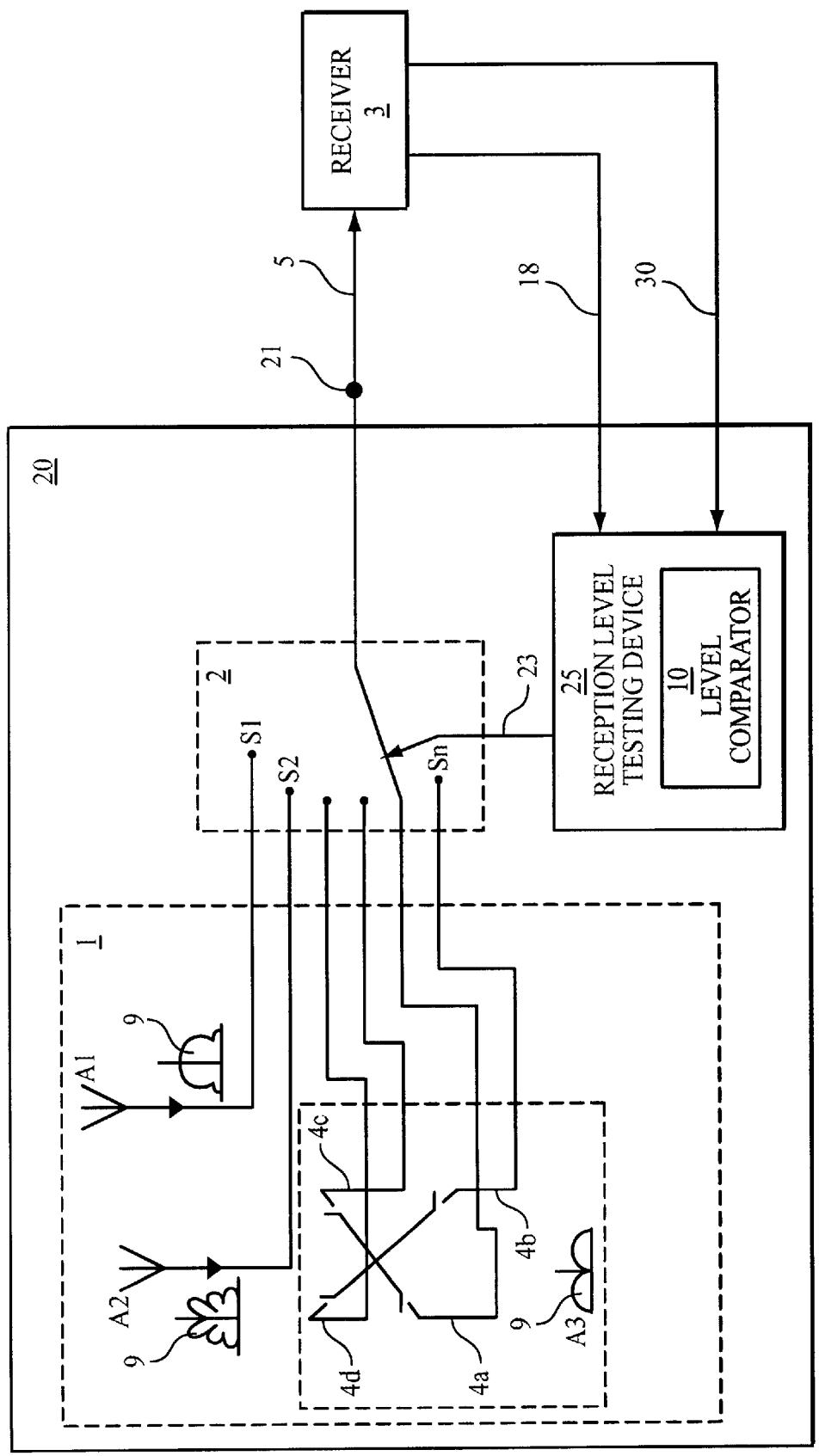
FIG. 1a shows an antenna diversity reception system as defined by the invention with an antenna arrangement and a receiver.

FIG. 1a shows an antenna diversity reception system as defined by the invention with an antenna arrangement 20 and a receiver 3, a logic circuit device 2, a receiver level testing device 25, with the symbol cycle signal 18 supplied via a pulse generator that can be triggered. A level comparator 10 is provided for the comparative determination of the receiver level 30.

In this radio system, signals having the same content transmitted for example by two satellites and by terrestrial transmitting stations via an HF channel bandwidth B of about 4 MHz each are transmitted in a close frequency neighborhood in relation to each other. For the transmission from the satellite, the digital QPSK method is used in this connection in most cases, and the COFDM method is mostly employed for the terrestrial transmission. It is necessary in either case to carry out the testing of the signals attendant to the selection of the most favorable received signal 5 so that no loss of data will occur, or that this loss will be as minor as possible, so that overall, the bit error rate is drastically reduced over the driving distance, because level fading events and thus phase errors connected therewith are avoided.

The diversity reception system shown in a basic form in FIG. 1a, is used for both digital types of modulation (COFDM and QPSK), by determining the level of the high-frequency signal within the HF channel bandwidth B with the help of the reception level testing device 25, in each instance, with the minimally possible level testing duration 11, and by advantageously carrying out this determination successively in terms of time. Both the coding of the OFDM signal, which is characterized by C, and the number M of the phase conditions of the MPSK signal (at QPSK, M=4) are not influenced by the instruction provided by the inventive circuit. By comparatively testing the level successively through reversals, with the help of logic circuit device 2, the available reception signals are successively selected within the frame of one test cycle with the help of a level comparator 10 and an addressable memory 35, so that a favorable reception signal 5 is then selected.

The test cycles are repeatedly initiated according to the invention in a running sequence after a suitably selected test cycle time spacing $T_z$ has elapsed. It is advantageous in this connection that if, after the test cycle has elapsed and the most favorable reception signal 5 has been selected, that the adjustment is maintained within the remaining time, within the test cycle time spacing $T_z$. Because of the limited HF channel bandwidth B, it is not possible to safely determine the reception level more rapidly than with the level test duration $T_p$~1/B. The reversing time 24 required for the antenna reversal itself is by one order of magnitude smaller than the level test time 11, so that the testing of the level and the reversal may take place jointly within the level test duration $T_p$ 13. To adjust a test cycle time spacing $T_z$ as defined by the invention, the following relation applies if the most favorable reception signal 5 has to be updated Z-times over the travel distance of one half wavelength:

$$T_Z \leq \frac{500 \text{ ms}}{Z \cdot f_{GHz} \cdot v_{kmh}} \quad (1)$$

With Z=5, $f_{GHz}$=2.33, and $V_{kmh}$=100, the result is $T_z$<430 µs, and at $V_{kmh}$=175, the result is $T_z$<=250 µs.

According to the invention it is important in this connection that the total time R·Tp required for R tests for testing and updating the most favorable reception signal 5 be substantially shorter than the test cycle time spacing $T_z$, so that the number of symbols identified with greater uncertainty will be as small as possible due to the selection process in connection with QPSK modulation. The following equation (1) applies to this relationship:

$$\frac{R \cdot T_p}{T_z} \geq 2 \cdot 10^{-6} \cdot Z \cdot R \cdot v_{kmh} \cdot f_{GHz} / B_{MHz} \quad (2)$$

With R=10 level tests per test cycle, and with a driving speed of 175 km/h, the relative time proportion required for selecting the most favorable reception signal 5 results according to equation (2), if the greatest possible test cycle time spacing $T_z$, with the other values specified above is adjusted to only 0.2%.

With COFDM modulation, it is desirable if the test cycle time spacing $T_z$ of equation (1) is selected to be greater than the FDM symbol duration $T_{sf}$, and the entire test cycle with an R number of required level tests is carried out within an FDM symbol duration $T_{sf}$, and if, in the interest of safe symbol identification, the total time $RT_p$ of an R number of tests is substantially smaller than the FDM symbol duration $T_{sf}$. Analogous to equation (2), with $T_{sf}=1/\Delta f_c$, with $B=N \cdot \Delta f_c$, and with $T_p=1/B$, the following relation $V_p$ is obtained:

$$V_p = \frac{R \cdot T_p}{T_{sf}} = \frac{R}{N_c} \quad (3)$$

With $N_c=1000$ and $R=10$, this relation comes to $V_p=1\%$ and is adequately small. The reduction of the effective time available for the symbol identification is thus diminished only insignificantly. With a number $N_c$ of the sub-carriers that is too low, the result could be an excessively large time proportion for the level tests for the relation stated in equation (3). Therefore, provision is made according to the invention, to divide the number of R tests into a number S of successive symbols, so that the testing time required within an FDM symbol duration $T_{sf}$ represents itself as $R \cdot T_p/S$ and the following applies accordingly to equation (3):

$$V_p = \frac{R \cdot T_p}{T_{sf} \cdot S} = \frac{R}{N_c \cdot S} \quad (4)$$

If the permissible test cycle time spacing $T_z$ is greater than the FDM symbol duration $T_{sf}$, then it suffices according to the invention, if the most favorable reception signal is not updated with each transmitted symbol. The following relation serves to determine the test cycle time spacing $T_z$ at the given HF channel bandwidth B, with the given number of sub-carriers $N_c$, and at the maximum driving speed $V_{kmh}$:

$$\frac{T_z}{T_{sf}} = \frac{B_{MHz} \cdot 10^6}{2 \cdot f_{GHz} \cdot v_{kmh} \cdot N_c} \quad (5)$$

Taking into account equation (4), it is therefore sufficient if a test cycle is carried out only in each integral $(T_z/T_{sf})$—ten successively following symbol.

However, with the numerical values specified above by way of example, a relation of $T_z/T_{sf} \sim 1$ is obtained for a maximum driving speed of $V_{kmh}=175$, i.e. according to the invention, the test cycle time spacing $T_z$ can be selected equal to the FDM symbol duration $T_{sf}$. At Z=5 updating events over a driving distance of $\lambda/2$ during only each second symbol received, the maximum driving speed thus would be limited to approximately 80 km/h.

With an advantageous low cost embodiment of the invention, the reception level testing device 25, and the logic circuit device 2 according to FIG. 1a are disposed in the neighborhood of the antenna arrangement 20 in terms of space. Moreover, the symbol cycle signal 18 is supplied together with the reception level 30 via a high-frequency line between antenna connection point 21 and receiver 3. This embodiment of the invention is connected with the advantage that receiver 3 does not need to be substantially pre-equipped for a reception system, of the invention, because symbol cycle signal 18 and reception level 30 are generally present in receiver 3, as a rule.

Therefore, FIG. 1a shows a basic embodiment of a reception system of the invention, whereby a bandpass 26 and a reception level indicator 36 (see FIG. 1c) are contained in receiver 3 whose output signal reflects reception level 30, and is supplied to a reception signal testing device 25. In addition, symbol cycle signal 18 is supplied to reception level testing device 25, so that a reversing signal 23 derived therefrom can be used by logic circuit 2, according to the sequence of level testing events described above for selecting a good or the most favorable reception signals 5. Antenna system 1 contains, in this embodiment, a number of individual antennas A1, A2, A3, which can be realized from antenna components 4a, 4b, 4c in view of the required diversity of the reception signals 5 with an advantageously high degree of freedom. To evaluate each symbol, an optimal reception signal 5 is thus available at antenna connection point 21 on the input of receiver 3.

Figure 1B:
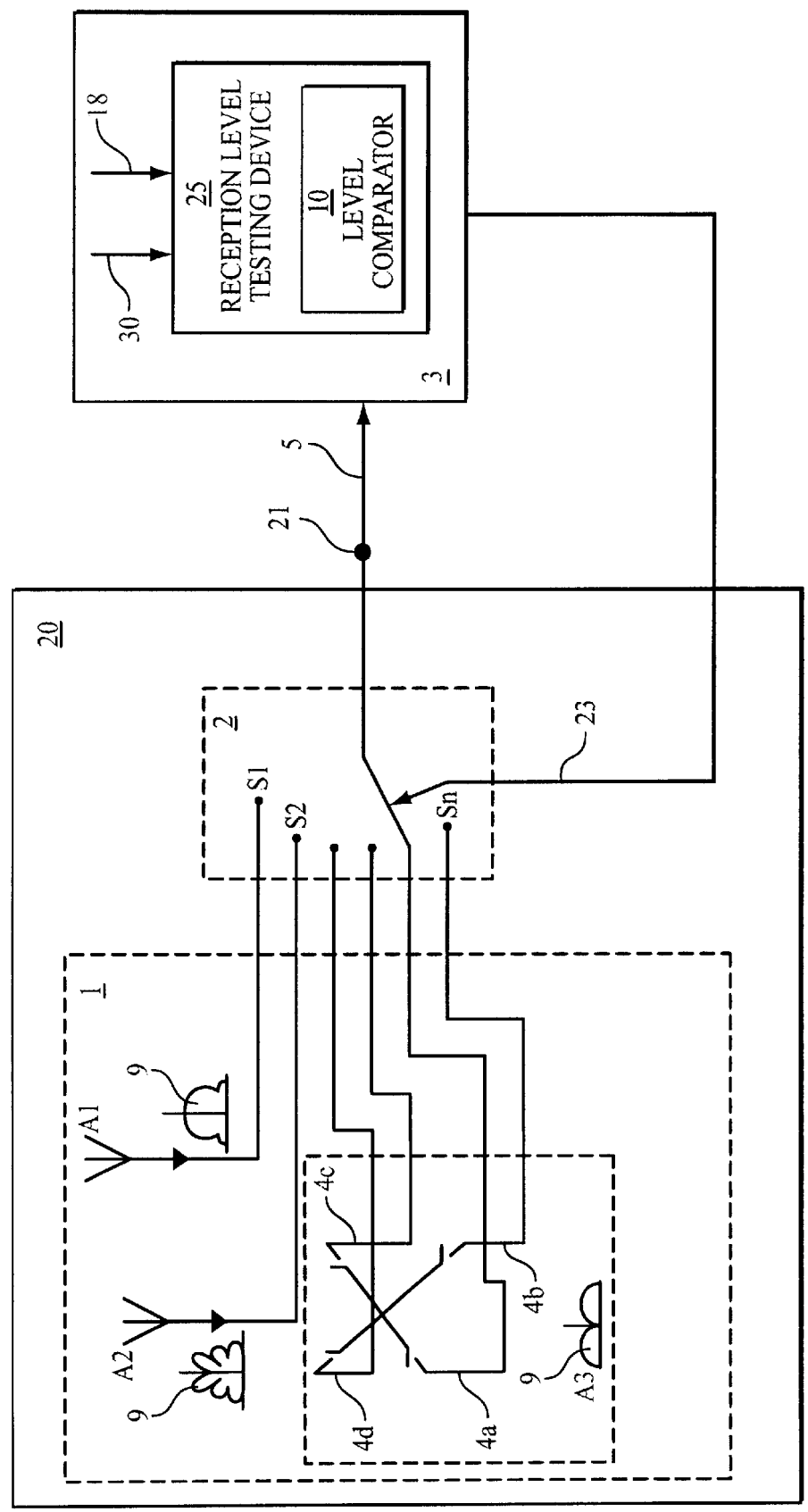
FIG. 1b shows the same circuit as FIG. 1a, but with a receiver level test device contained in the satellite radio receiver.

FIG. 1b shows an arrangement of the invention that is similar to the one of FIG. 1a, but with reception level testing device 25 contained in the satellite radio receiver 3.

Figure 1C:
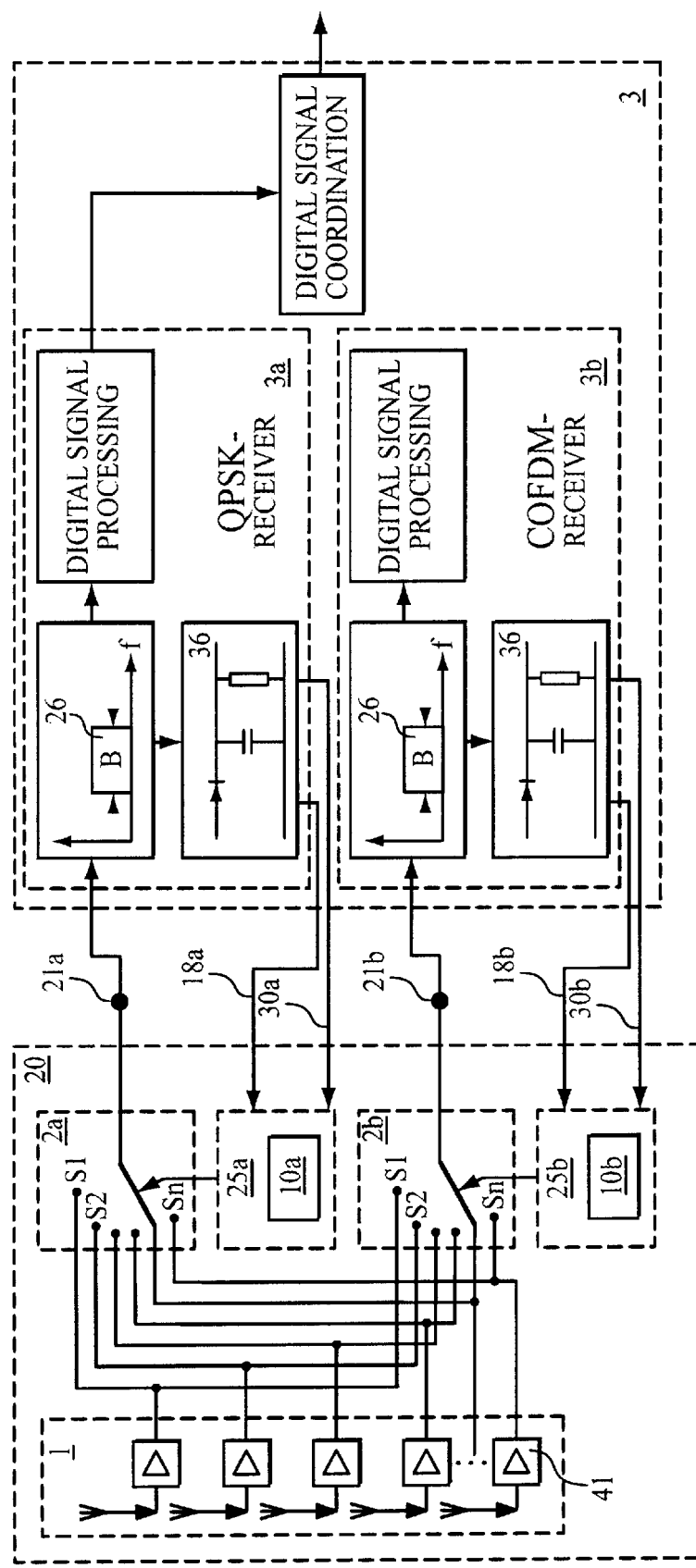
FIG. 1c shows a similar circuit as FIG. 1a, but with a receiver 3 having receiver branches for signals with QPSK modulation and for receiving signals with COFDM and COFDM modulation of the HF-carrier.

FIG. 1c shows a combined antenna diversity system of the invention for the simultaneous and coordinated reception of digitally modulated satellite radio signals according to the Q-PSK method, and of radio signals digitally modulated according to the COFDM method and transmitted by terrestrial radio stations according to the COFDM method, on neighboring high-frequency bands with the same HF channel bandwidth B, but in each case with a signal content that is offset by the traveling time.

Both systems have an antenna arrangement 20 with an antenna system 1, which supplies reception signals 5 that are different in terms of diversity. With the help of the logic circuit device 2a and reception signal level testing device 25a, the most favorable reception signal 5 is offered in the updated form to receiver part 3a for receiving the QPSK-satellite signal at the antenna connection point 21a via the test cycle process, in each case, with a test cycle time spacing $T_z$. Likewise, in each case following the level testing events at the start of an FDM symbol duration $T_{sf}$, the reception signal 5 that is the most favorable for receiver part 3b for receiving the COFDM-modulated terrestrial signal is available at the antenna connection point 21b. Both of the receiver parts 3a and 3b are contained in receiver 3 for evaluating the reception signals with the same signal content. According to the invention, for the antenna selection in the QPSK receiver, reception level 30a and symbol cycle signal 18a are supplied to the reception level testing device 25a with level comparator 10a.

Figure 1D:
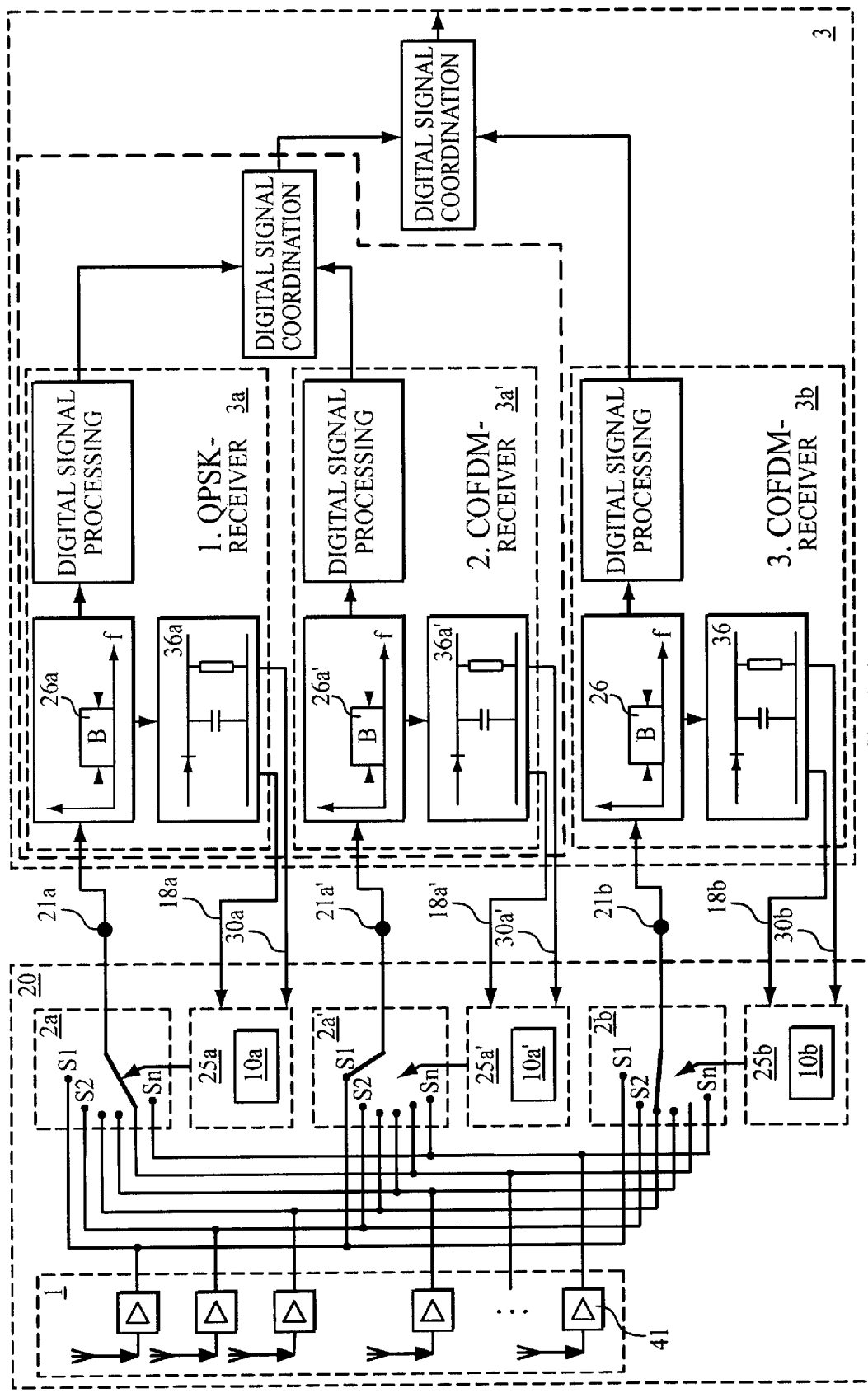
FIG. 1d shows a similar circuit as FIG. 1c, but with a receiver with a further reception branch for signals with QPSK modulation which are transmitted by another satellite.

In FIG. 1d, the combined antenna diversity system of the invention shown in FIG. 1b is supplemented by another branch whose components are denoted by "a'", for the simultaneous and coordinated reception of a further satellite radio signal digitally modulated according to the QPSK method. This satellite radio signal is transmitted for supporting the reliable transmission of another satellite, for the simultaneous and coordinated reception of radio signals transmitted by the first satellite, and of the radio signals transmitted by terrestrial radio stations on neighboring high-frequency bands having the same HF channel bandwidth B, in each case, of the same signal content offset by the traveling time. All received signals are coordinated and evaluated in the receiver 30, so that the most reliable data transmission is obtained by means of the antenna diversity function, in association with the two satellite transmission paths, and the terrestrial transmission path.

Both in connection with signals with QPSK modulation and COFDM modulation of the HF carrier, the test cycle time spacing $T_z$ is therefore selected according to the invention so that the reception conditions are practically constant within this time. This is effected by updating this adjustment at least five times within the driving distance amounting to one half of the wavelength of the high-frequency carrier. This is illustrated in FIG. 2 with the help of the reception signals of the antennas A1, A2 and A3 over the driving distance "s" based on the wavelength λ, with the help of the time raster shown below by way of example for the test cycle time spacing $T_z$=250 μs at a driving speed of 100 km/h.

Figure 2:
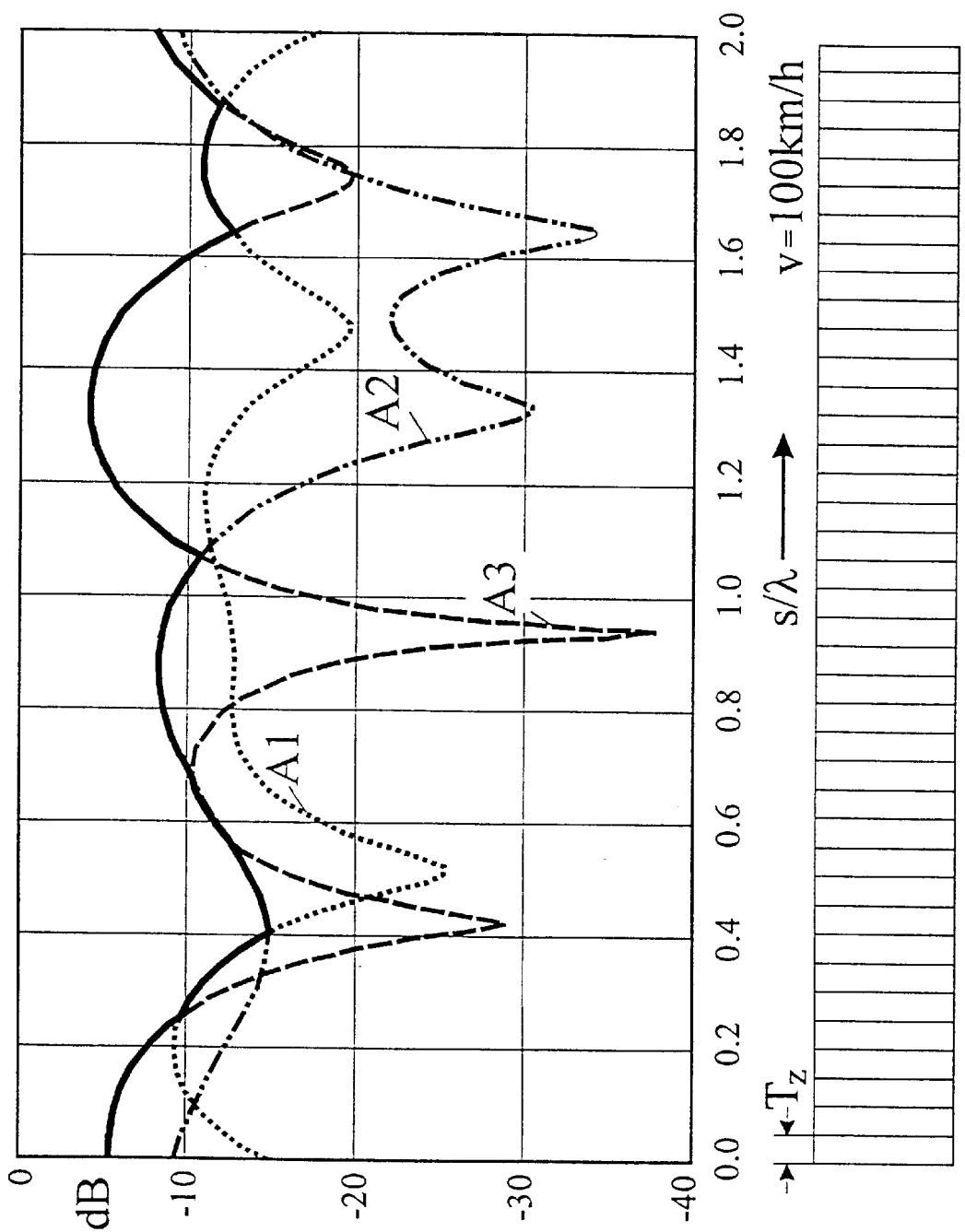
FIG. 2 shows the level curves of the received signals of three individual antennas over a driven distance of $2\lambda$.

FIG. 2 shows level curves of the received signals of three antennas over a driven distance of 2λ, and the maximum level (top) selected therefrom according to the invention by antenna diversity. The time raster (bottom) represents a test cycle time interval $T_z$ that is adequately short for a driving speed of 100 km/h for updating the most favorable received signal 5 for the maximum level while driving a distance of λ/20.

FIG. 3a and b shows a representation of the time sequence of the level testing events triggered by the symbol cycle 18. During the entire test time 7, the individual antennas are successively switched on for the test time 11 and the associated reception level is determined. Following a reversing time 24, the next individual antenna is switched on, so that up to R individual antennas can be evaluated one after the other with respect to level.

FIG. 3a shows the COFDM modulation including R level testing events with level testing duration $T_p$=1/B at the beginning of a symbol with FDM symbol duration $T_{sf}$, and a test cycle time spacing $T_z$ selected with the same length as the latter.

FIG. 3b shows the M-PSK modulation including R level testing events with level testing duration $T_p$=1/B in successively received symbols with MPSK symbol duration $T_{sf}$=1/B initiated with a suitably selected test cycle time spacing $T_z$.

Figure 4C:
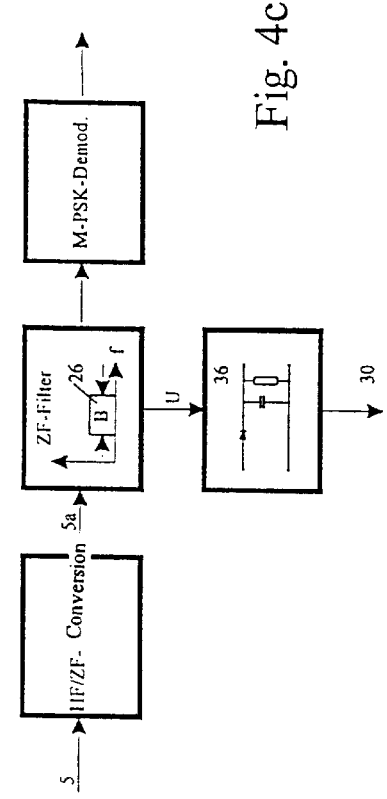
FIG. 4c shows the mode of operation of the reception level testing device 25 in the ZF-plane of the receiver.
Figure 4D:
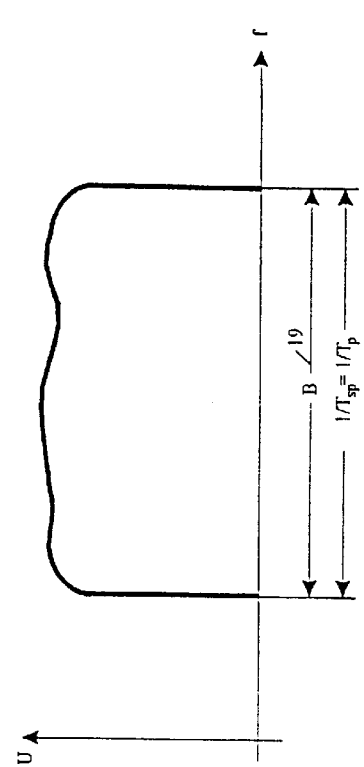
FIG. 4d shows the ZF frequency spectrum of the M-PSK signals.
Figure 4A:
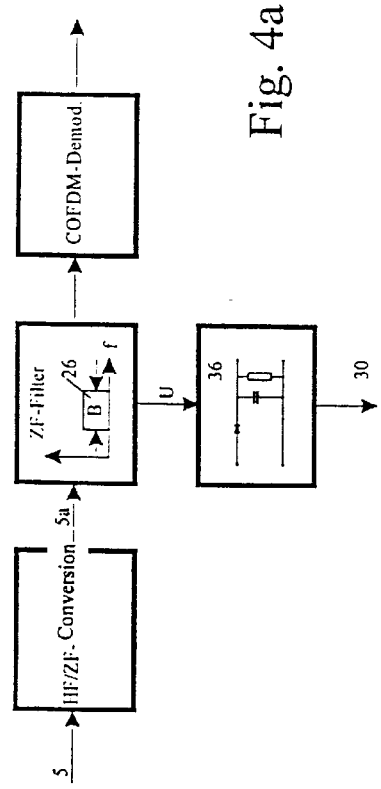
FIG. 4a shows a circuit for the mode of operation of the reception level test device in the ZF-plane of the receiver.

FIG. 4a shows the mode of operation of the reception level test device 25 in the ZF-plane of the receiver with the reception level indicator 36 for receiving COFDM signals. FIG. 4a shows the evaluation of the frequency band with COFDM modulation of the HF carrier with the help of the reception level indicator 36.

Figure 4B:
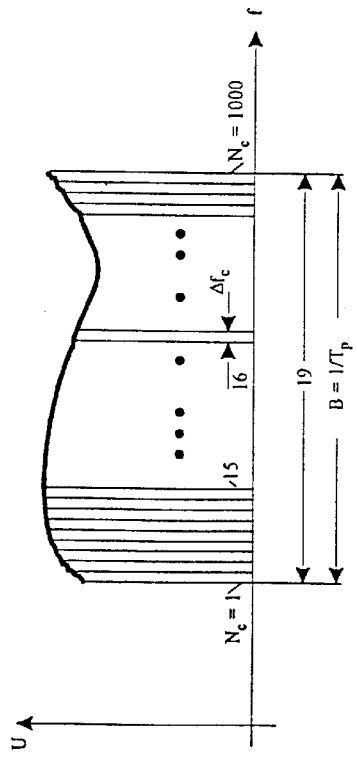
FIG. 4b shows a spectral representation of the COFDM signal.

FIG. 4b is a spectral representation of the COFDM signal with $N_c$ sub-carriers 15 with a spectral frequency spacing $\Delta f_c$ at a bandwidth B with low level fluctuation of the individual carriers because of the frequency-dispersing transmission channel. FIG. 4b shows the sub-carriers with the frequency spacing $\Delta f_c$ 16 in the intermediate frequency plane of the receiver. With an FDM symbol duration $T_{sf}$ of, for example 250 μs conforming to the frequency spacing $\Delta f_c$ 16, which is available for the phase identification of the $N_c$ number of sub-carriers parallel in time, a small time proportion that is technically negligible in comparison thereto is used according to the invention for finding among reception signals 5 available in terms of diversity, the one that results in a adequately large S/N ration, or supplies the maximum S/N ratio as compared to the other signals. This is made possible through the HF channel bandwidth B=$N_c$ $\Delta f_c$ 19, which is large in comparison to the frequency spacing of the sub-carriers, so that the level test time 11 can be selected smaller than the symbol time $T_{sf}$ 14 by the order of magnitude of the number $N_c$ of the sub-carriers. With the large number of $N_c$=1000, thus up to 10 reception signals 5 in terms of diversity can be successively tested with respect to level with a time expenditure of about 1 to 2% of the FDM symbol duration $T_{sf}$ required for such testing. The test cycle time spacing $T_z$ selected as defined by the invention defines after how many received symbols, the following symbol will be used for updating the most favorable reception signal 5.

FIG. 4c shows the mode of operation of the reception level testing device 25 in the ZF-plane of the receiver with the reception level indicator 36 for receiving M-PSK signals. Here, the frequency band is evaluated with the MPSK modulation of the HF carrier present with the help of the reception level indicator 36 as well.

FIG. 4d shows the band-limited frequency spectrum of the M-PSK reception signals in the intermediate frequency planer of the receiver. With a QPSK symbol duration $T_{sp}$ [for example of 0.25 μs=1/B=1/(4 MHz)], a comparatively technically negligible time proportion of the test cycle time spacing $T_z$ of the invention is used for selecting among reception signals 5 that are available in terms of diversity, the one that results in an adequately large signal-to-noise ratio, or which supplies the maximum S/N ratio in comparison to the other signals. This is substantiated by the large bandwidth B in view of equation (1).

With a QPSK symbol duration $T_{sp}$=1/(4 MHz)=0.25 μs, a relative number of only R·($T_{sp}/T_z$)=R/1000 symbols is obtained for R level tests, which are not received with an optimally available reception signal 5. However, the correct symbol identification is still probable for the predominant majority of the symbols because of the statistics of the reception field. The few symbols that may be subject to erroneous identification in this connection are corrected by the redundancy given with each digital communication system with error correction. On the other hand, the remaining symbols transmitted during the test cycle time space Tz are received with the full diversity effect of the available reception signals. This means that with a suitable selection of antennas in antenna system 1, a high diversity efficiency is achieved that strongly reduces the bit error rate over a driving distance, and highly reduces the probability of break-off or interruption of the radio connection with the problems of new synchronization. FIG. 3b shows the QPSK symbol duration $T_{sp}$=1/B, which is about equal to the level test duration $T_p$; the time sequence for an R number of level testing events, as well as a test cycle time spacing $T_z$ selected as defined by the invention.

To realize such a sequence for a QPSK modulation of the HF carrier with the carrier frequency "f", a pulse generator 31, for example, is present in the reception level testing device 25, which is supplied both with the reception level 30 and the symbol cycle signal 18 generated in the receiver. This pulse generator is triggered by symbol cycle signal 18 according to the number R of reception signals 5 to be tested, and thus supplies a pulse sequence whose pulse spacing time is equal to the QPSK symbol duration $T_{sp}$~1/B. The respective pulse sequence is transmitted in each case both to the pulse comparator 10 with the addressable memory 35, and to the logic circuit device 2 for switching in reception signals 5 in a sequential or addressed manner for selecting a reception signal 5 that is favorable in terms of diversity. After the required number of R level testing events has expired, the condition of triggerable pulse generator 31 and thus also the condition of logic circuit device 2 preferably remain unchanged via a time element 42 contained in pulse generator 31 for adjusting the test cycle time spacing $T_z$ until the comparative test cycle is newly initiated after $T_z$ has elapsed.

In the invention, with signals with COFDM modulation of the HF carrier, the level fading events are also reduced by determining the level of the actually switched-on high-frequency signal within the HF channel bandwidth B, in each case, after the minimum level testing duration $T_p=1/B$. The COFDM signal is composed of the time sequence of an $N_c$ number of parallel transmitted, phase-modulated sub-carriers with the frequency spacing $\Delta f_c$. Each packet of these sub-carriers is emitted in each case over the FDM symbol duration $T_{sf} 1/\Delta f_c$. To select a reception signal 5 that is as favorable as possible in terms of diversity, it is therefore possible to use the determination of the total energy that occurs in the IF-range in a band pass filter 26 of the channel bandwidth $B=N_c \Delta f_c$ over the level test duration $T_p$. $N_c$ (e.g. $N_c$=1000) represents the number of the sub-carriers transmitted according to the COFDM method, whose frequency spacing ($\Delta f_c$) 16 amounts to, for example 4 kHz.

With this method, the multiple comparative level test takes place at the beginning of each transmitted symbol. In the present example, with level test duration $T_p$=1/B=0.25 $\mu$s, it takes a total test time of R·0.25 $\mu$s for selecting the most favorable reception signal 5 at an R number of level tests. This corresponds with a FDM test duration $T_{sf}$=1/$\Delta f_c$= $N_c$/B=1000*0.25 $\mu$s=250 $\mu$s. Under such quantity conditions, therefore, the entire remaining time of the FDM symbol duration $T_{sf}$ of (1−R/$N_c$)=(1−R/1000)*250 $\mu$s is available for identifying the symbol. This insignificant reduction of the time available for symbol identification is not connected with any deterioration of the identification. FIG. 2 shows that this symbol duration is adequately short for securing the frequent updating of the most favorable reception signal 5 even at high driving speeds. The comparative test process at the beginning of the FDM symbol duration $T_{sf}$, with the level test times $T_p$ with the reversing times of about 0.25 $\mu$s as well as the guard time $T_g$, is shown in FIG. 3a.

So that a sequence can be realized, a pulse generator 31 that can be triggered, is also present in the case of FDM modulation, for example in the reception level test device 25, which is supplied with both the reception level 30 and symbol cycle signal 18 generated in the receiver. This pulse generator is triggered by symbol cycle signal 18. Due to this triggering, it automatically generates a pulse sequence in accordance with the number of R reception signals to be tested, having a corresponding pulse sequence whose pulse spacing time is preferably selected as short as possible. It is thus about equal to the level test time $T_p$~1/B. The pulse spacing time consists of level test time 11 plus the comparatively short reversing time 24. The respective pulse sequence is transmitted to both the level comparator 10 with the addressable memory 35, and the logic circuit device 2, to sequential or address switch reception signals 5, to select a reception signal 5 that is favorable in terms of diversity. After the required R number of level testing events has elapsed, the condition of the triggerable pulse generator 31 and logic circuit device 2 remains unchanged over the remaining time within the FDM symbol duration $T_{sf}$ until triggerable pulse generator 31 is triggered again, and the comparative test cycle is initiated again with one of the following symbols, preferably with the next symbol.

Figure 4E:
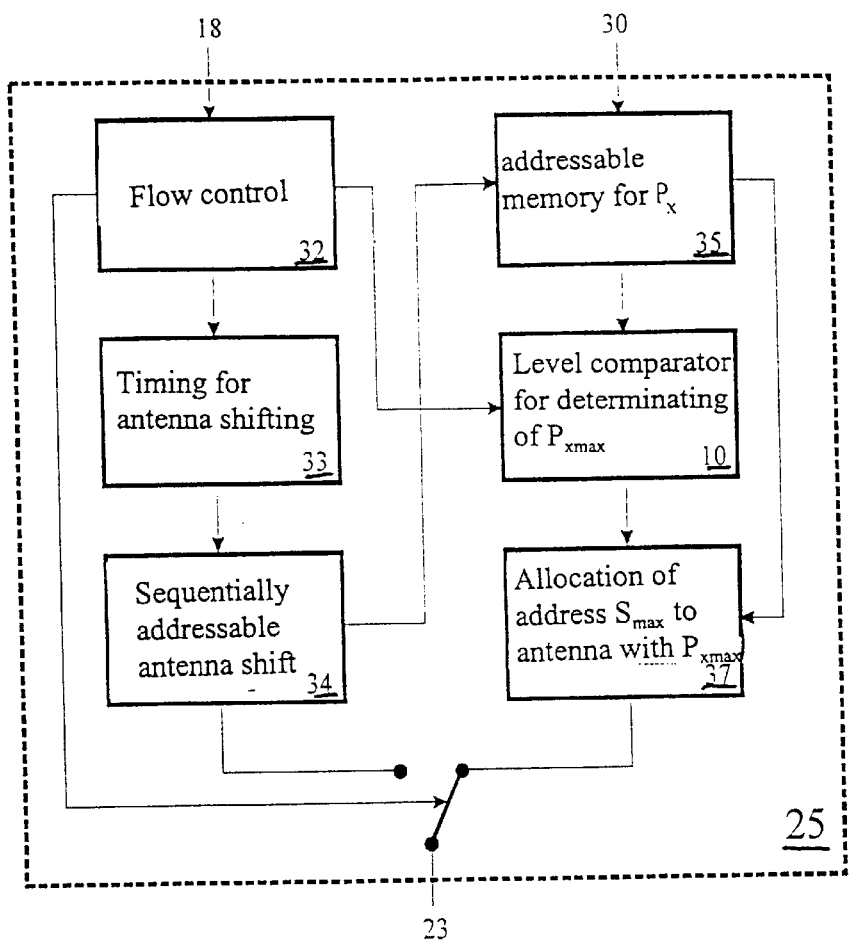
FIG. 4e shows the embodiment of the reception level testing device 25 of the invention.

FIG. 4e shows a block diagram for both digital types of modulation for an embodiment of this arrangement. In a timely embodiment, the entire reception level testing device 25 is designed as a microprocessor, which is controlled by a program, and processes, for example the program blocks shown in FIG. 4e. To determine the most favorable reception signal 5, it is possible to use in the level testing device 25, for example the arrangement shown in FIG. 4e. Device 25 consists of a sequence control 32, which controls both the cycle generation for the antenna reversal 33 and the level comparator 10 for finding the most favorable reception level 5 ($P_{xmax}$), as well as a reversing switch for issuing the reversing signal 23. The maximum signal level switching position $S_{max}$ 37 is determined and issued as the reversing signal 23, with the help of an addressable antenna reversal 34, an addressable memory 35 for the reception level $P_x$ 30 of the xth antenna, and level comparator 10.

Thus, the antenna diversity system of the invention for both types of modulation, in the presence of the highest possible data during the selection process for selecting the most favorable reception signal 5, reduces the probability of any level fading events in the best possible way. This is illustrated again in the representation of FIG. 3a. With each selection of a favorable reception signal 5 at the beginning or end of a transmitted symbol, with COFDM modulation of its $N_c$ number of sub-carriers, the number of 2×$N_c$ bits with a good signal-to-noise ratio is transmitted with each symbol, i.e. in the course of the FDM symbol duration Tsf. With an M-PSK modulation of the HF carrier in FIG. 3b, an R number of level tests takes place in symbols successively transmitted in time within the selected test cycle time spacing $T_z$. If this spacing is selected equal to the FDM symbol duration $T_{sf}$, about the same amounts of information are transmitted with both types of modulation within the same time spans.

The level distributions of three antennas are schematically shown in FIG. 2 based on the relative distance s/λ. These distributions are caused by unavoidable reflections and deflections in the near range of the antenna. The curve drawn denotes the maximum level available in each case when the most favorable reception signal 5 is selected. In the scale below FIG. 2, the sequence of the test cycle time spacings $T_z$ is shown at an assumed driving speed of 100 km/h. On the average, level fading events occur with high probability every half wavelength. With an FDM symbol duration $T_{sf}$ of 250 $\mu$s, an adequate number of about ten symbols therefore is about half a wavelength. Thus it is possible to realize the thickly drawn level curve in the signal gain. As shown above, this dimensioning permits at Z=5 a driving speed of about 175 km/h.

Figure 5A:
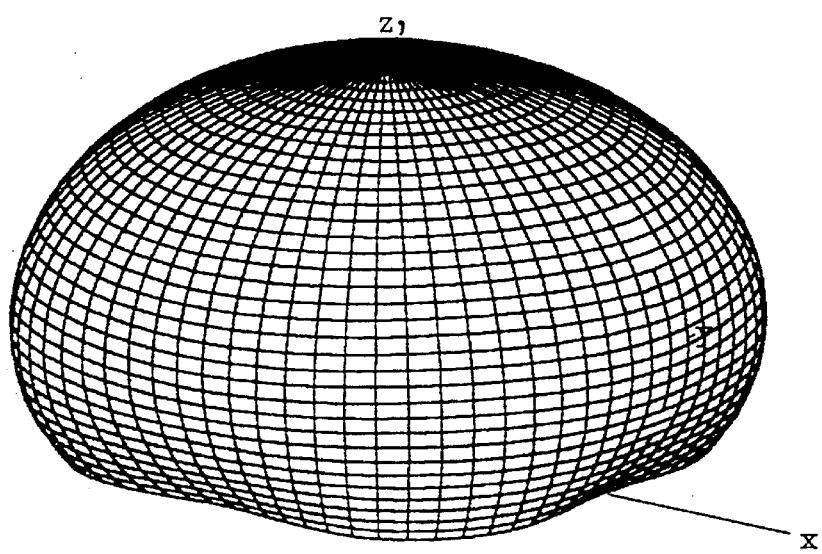
FIG. 5a shows a three-dimensional omnidirectional direction diagram for circular polarization of an antenna suited for satellite radio service.

In FIG. 5a, the antenna arrangements 20 are explained for antenna diversity systems of the invention. FIG. 5a shows a three-dimensional, almost omnidirectional diagram for the circular polarization of an antenna suited for a satellite service. This antenna will largely meet the desired requirements if it is mounted on a plane plate (FIG. 8a). To illustrate the effects which an invisible mounting of an antenna on the vehicle has in view of the directional diagram, FIG. 5d shows the deformation of the vertical diagram of the directional diagram shown in FIG. 5a if the respective antenna is mounted in a tub-like deepening 58 as shown in FIG. 5d. The specified antenna gain is not reached especially in the angle range of low elevation (see FIG. 5d). To overcome an oppositely disposed shading by walls, it is possible, for example to use a sectoral directional diagram 9 in the form shown in FIG. 5e. A number of such sectoral directional diagrams 9 are necessarily required for covering the entire azimuth.

Accordingly, it is shown that the specified directional diagram of the antenna gain cannot be reached with a single antenna in many sites of installation that are favorable under vehicle-specific aspects. However, according to the present invention, it is possible to design several individual antennas having different sectoral directional diagrams 9 with the main directions 29 pointing in different three-dimensional directions. This is shown by way of example for 5 different directional antennas in FIG. 5b. If the covering surface is formed over all diagrams, a diagram as shown in FIG. 5c is obtained, in which the radiation is raised in the areas of small elevation angles by the increased directional effect of the individual antennas. It is shown, furthermore, that it is hardly possible to produce at reasonable cost, an ordered circular polarization for the sectoral directional diagrams 9 for antennas inconspicuously integrated into the vehicle. The invention provides that increased sectoral directional effects are produced, so that the 3 dB loss, due to the omission of circular polarization is compensated for, or overcompensated.

Figure 6:
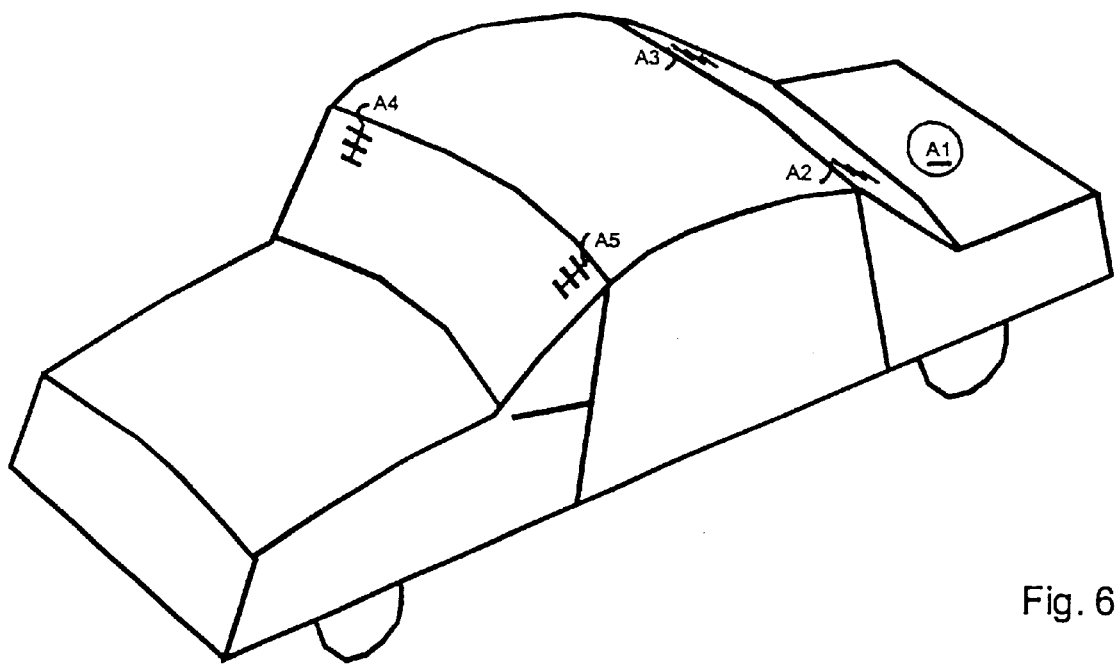
FIG. 6 shows an antenna system of the invention with a single antenna on the trunk lid, and additional antennas integrated in the body of the motor vehicle.

In FIG. 6, an embodiment of an antenna A1 is shown with the specified directional diagram based on the measuring plate, and mounted, for example on the trunk lid or under a plastic trunk lid. Because of the shading caused by the rear window and the roof of the vehicle especially in the area of low elevation, this area is filled in according to the invention by the additional antennas A4, A5. As indicated, for example in FIG. 6, these antennas may be mounted on the windshield as directional antennas. With the given dimensions of the vehicle, the differences in traveling time attendant to such a decentralized system, with the cable leading to the logic circuit device 2, has no influence on the signal following decoding. With a flat slant of the window panes, the entire antenna system 1 can be provided on these window panes using only directional antennas A2, A3, A4 and A5.

Figure 7:
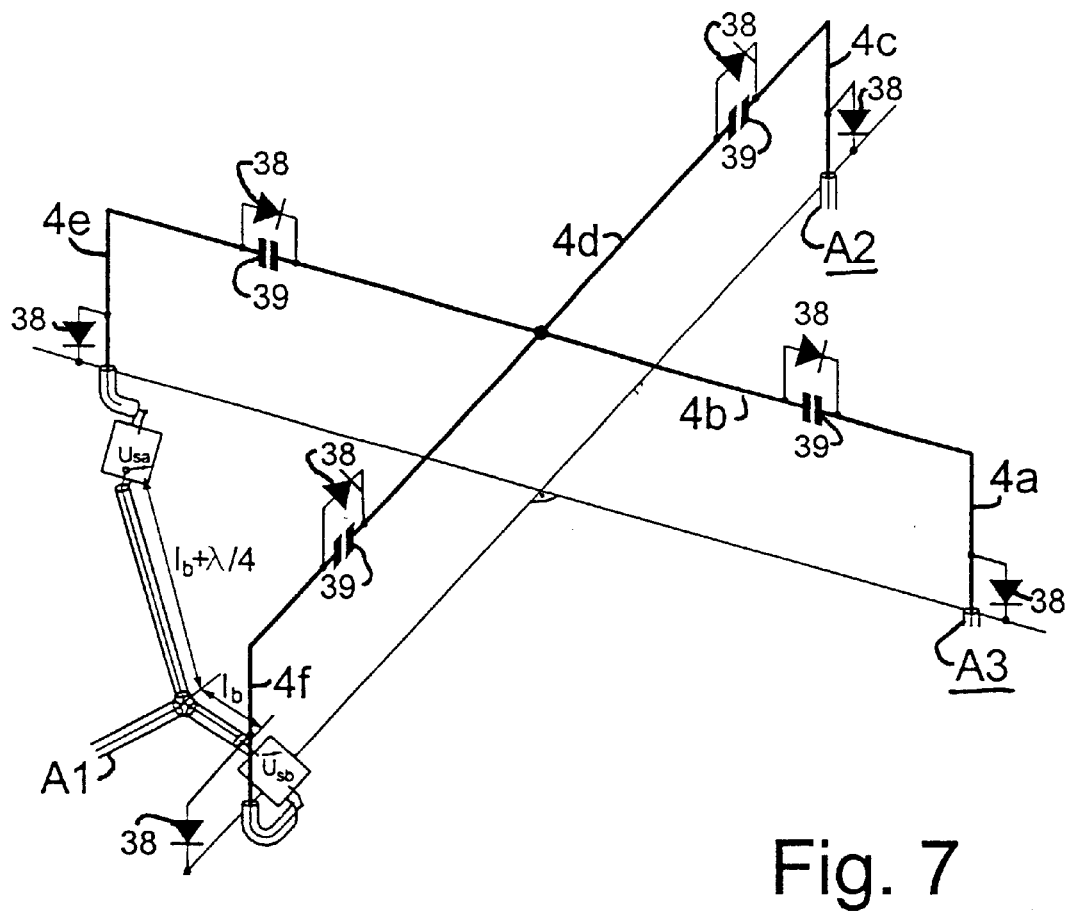
FIG. 7 shows individual antennas of the invention with the switching diodes and capacitive elements.

FIG. 7 shows an antenna system 1 of the invention with a low structural height. This antenna substantially has two crossed frame structures in which the impedance elements 39 are integrated so as to adjust the directional diagram, which to a large extent, corresponds with the specified directional diagram with circular polarization when diodes 38 are switched to blocking. Several sectoral directional diagrams 9 are alternately adjusted to fill up the covering surface by other settings of switching diodes 38.

A completely covered installation of antennas is often required in motor vehicles. FIG. 8a shows a tub-like deepening or trough 58 provided for this purpose in the conducting body of the vehicle, which is provided with a plastic covering. In an advantageous embodiment of the invention, a patch antenna A1 is mounted in the center of the tub on its bottom 64 for covering the steep radiation. Additional patch antennas are mounted on the correspondingly slanted tub walls 63 for creating the sectoral directional diagrams 9.

Figure 8B:
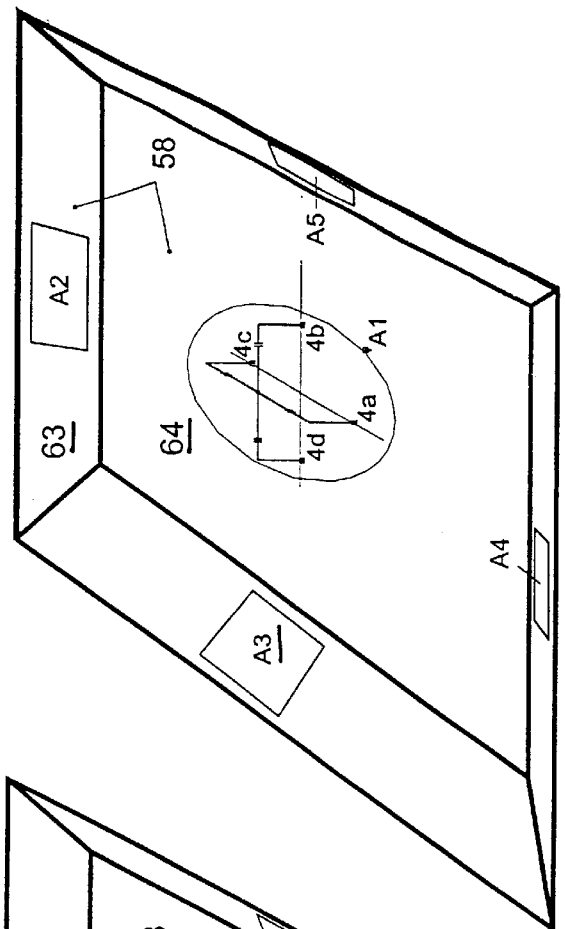
FIG. 8b shows the same system as FIG. 8a, but with a single antenna similar to FIG. 7.
Figure 8A:
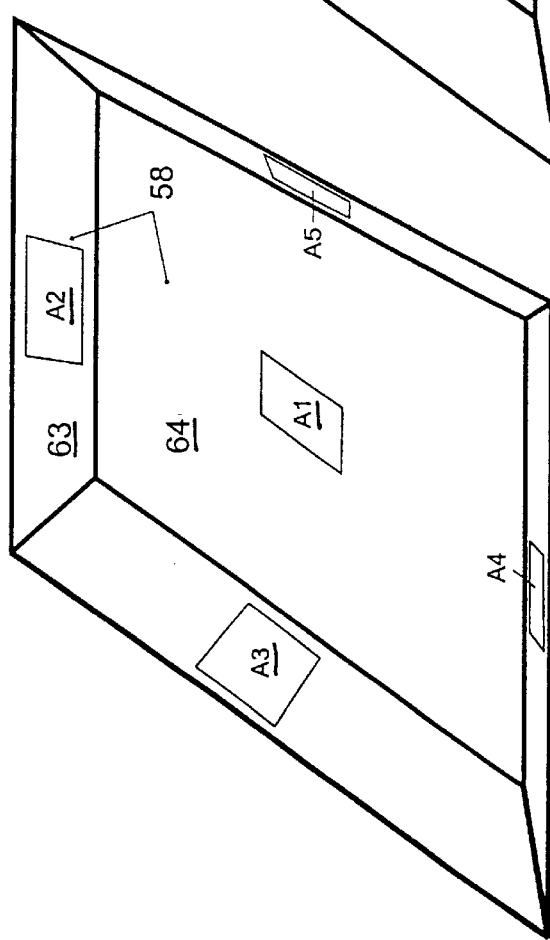
FIG. 8a shows an antenna system disposed in a metallic, tub-like trough.

To enhance the directional diagrams for steep radiation, the antenna of FIG. 7 is used in the center of the tub of FIG. 8b instead of the patch antenna A1, without diodes 38.

Figure 9A:
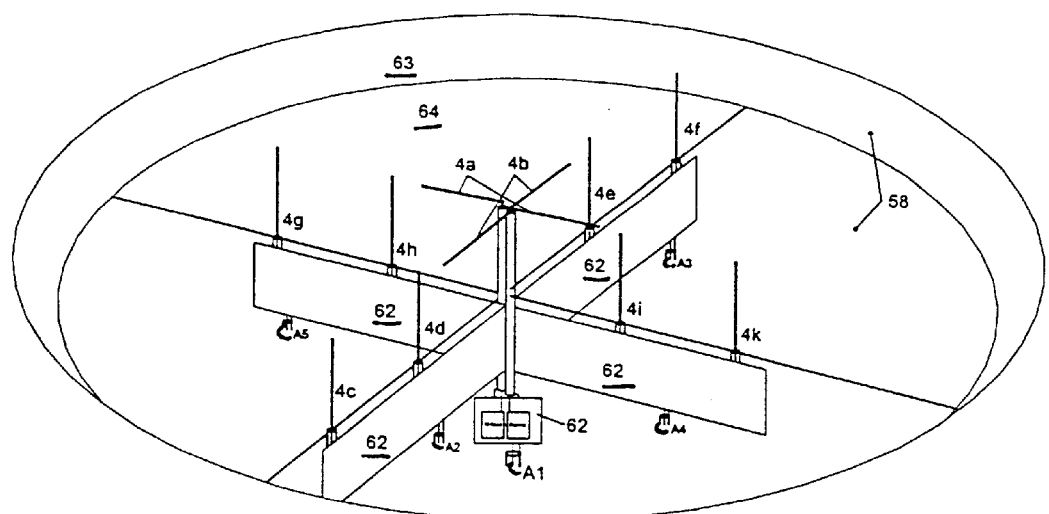
FIG. 9a shows another antenna system designed as a horizontal crossed dipole in a metallic, tub-like trough.

FIG. 9a shows a circular tub-like deepening 58, with two crossed dipoles formed from the antenna components 4a and 4b, and disposed in the center, above the bottom surface 64 of the tub, with a spacing from the bottom. To enhance the radiation for low elevation signals, two vertical group antennas formed from antenna components 4c, 4d, 4e, 4f and 4g, 4h, 4l and 4k, are arranged at an angle of 90 degrees in relation to one another.

Figure 5B:
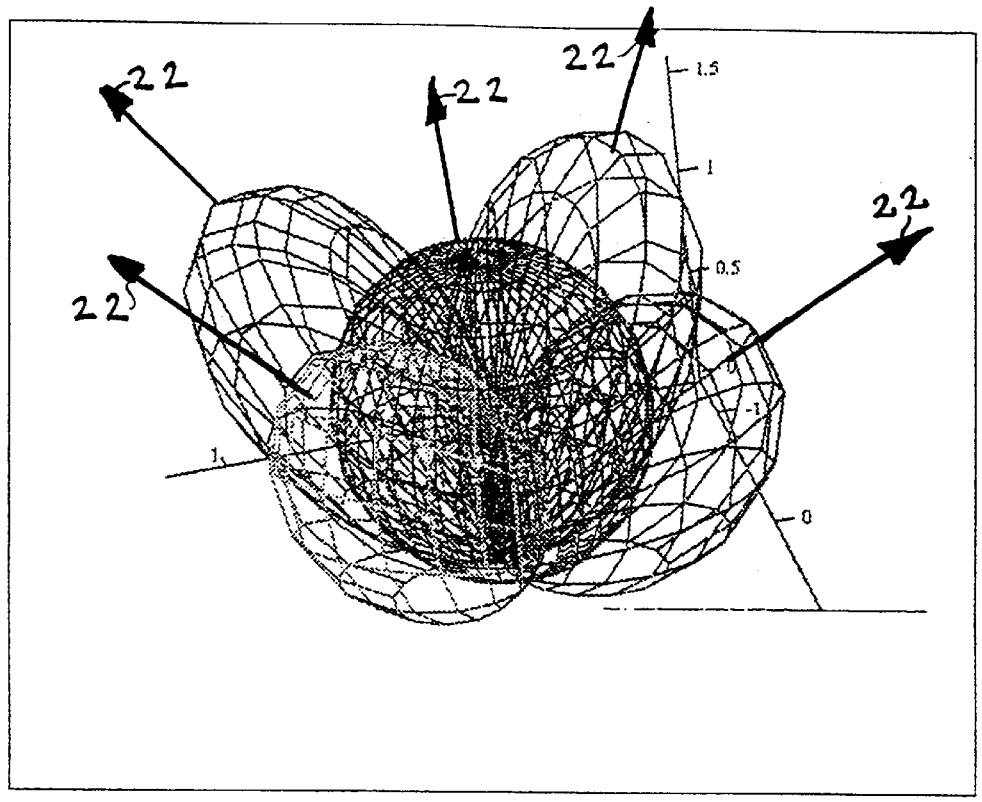
FIG. 5b shows a three-dimensional directional diagram of a reception system with the different main reception directions.
Figure 5C:
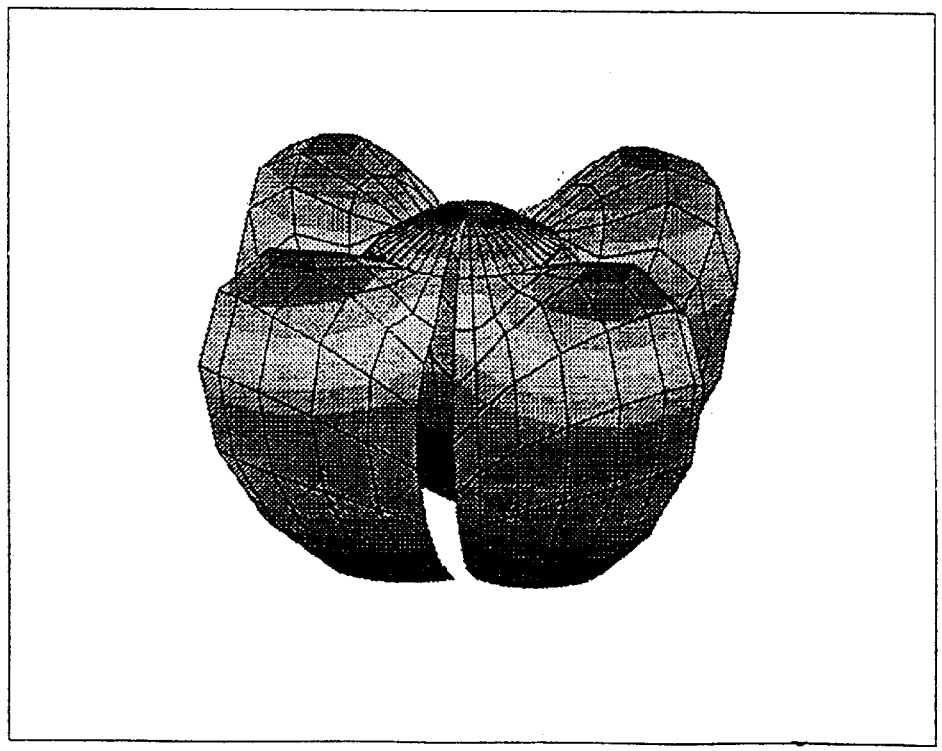
FIG. 5c shows a cover surface that can be adjusted with a reception system for the required antenna gain with circularly polarized waves.
Figure 5D:
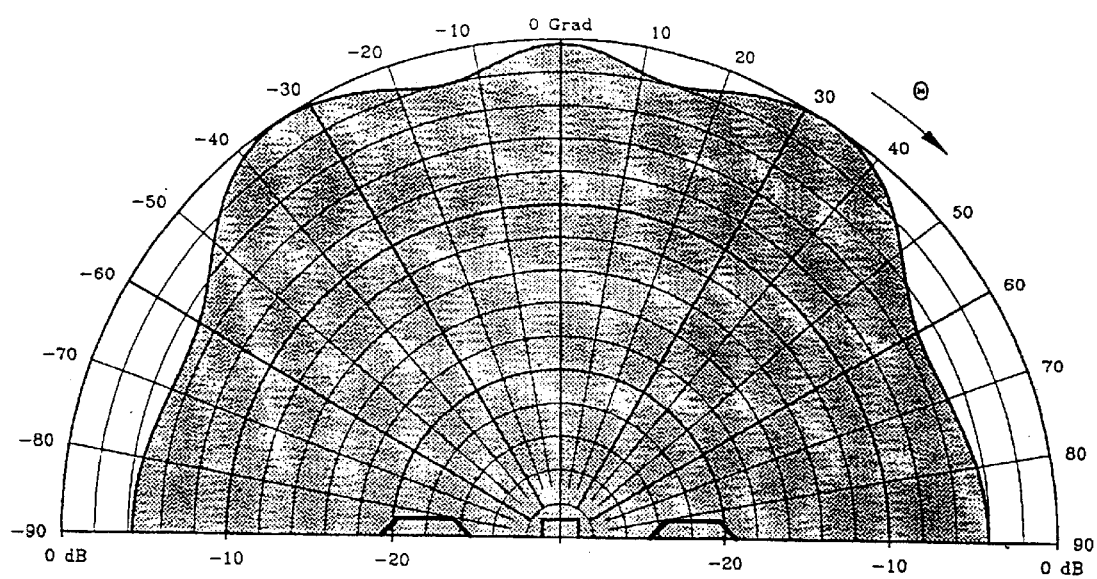
FIG. 5d shows the deformation of the vertical diagram of an antenna originally mounted on a conductive plate.
Figure 5E:
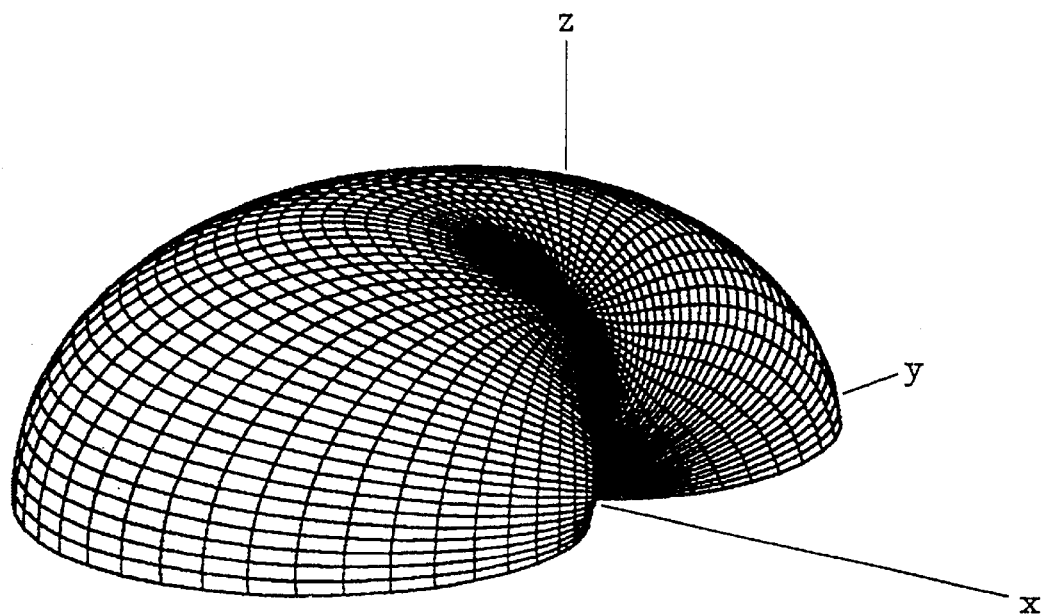
FIG. 5e shows the three-dimensional diagram with a single antenna with sectoral illumination.
Figure 9B:
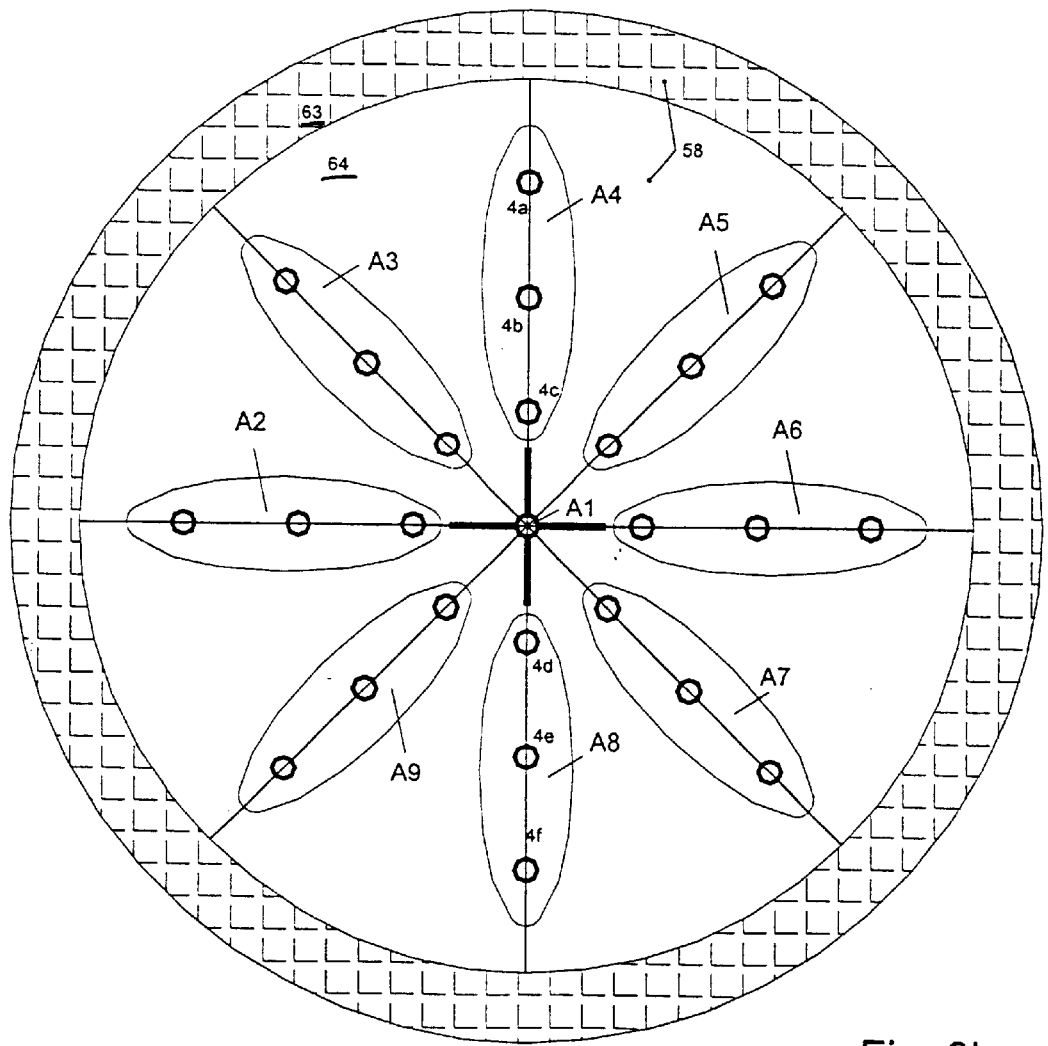
FIG. 9b is a top view of a recessed antenna system that has 8 individual antennas in the form of a star.

Their antenna signals are fed to a network 62 with the individual antenna connections A2 and A3, and respectively, A4 and A5, for switching the signals together, for forming the sectoral directional diagrams 9 for the four azimuthal main directions 22 (see FIG. 5b). With the help of the increased directional effect of the group antennas for low elevation, the shading caused by the slanted tub walls 63 is cancelled or overcompensated. FIG. 9a shows another embodiment of an antenna system, designed as a horizontal crossed dipole, in a metallic trough 58. It has a single antenna A1, designed in the form of a horizontal, crossed dipole, and with the antenna components 4c and 4d of an individual antenna A2 formed via a network 62 for switching the antennas together, and with the individual antennas A3 to A5 formed in a similar way. The antenna system 1, shown in FIG. 9a can be advantageously expanded in the same sense to form the antenna system 1 shown in FIG. 9b, which provides a greater number of sectoral directional diagrams 9. Depending on the site where this antenna system 1 is mounted, and the signal shading caused by the vehicle, antenna system 1 can be equipped with group antennas that are asymmetrically arranged in the center.

Figure 10A:
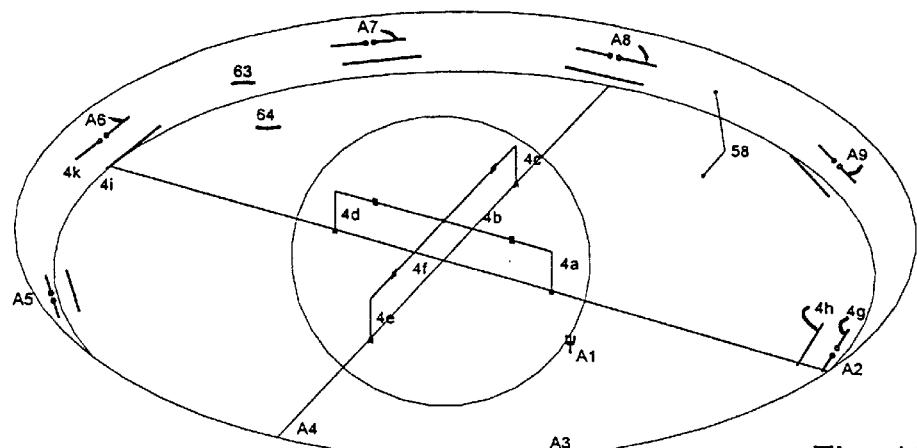
FIG. 10a shows an arrangement of recessed individual antennas similar to FIG. 7.

FIG. 10a shows another advantageous embodiment of an antenna system 1 of the invention. Here, the slanted tub walls 63 are used as reflectors of the group antennas A2 to A9, with the horizontally polarized antenna components 4h and 4g, mounted on the walls with a spacing from the latter. An antenna as shown in FIG. 7 can be used in the center, selectively also without the diodes 38.

Figure 10B:
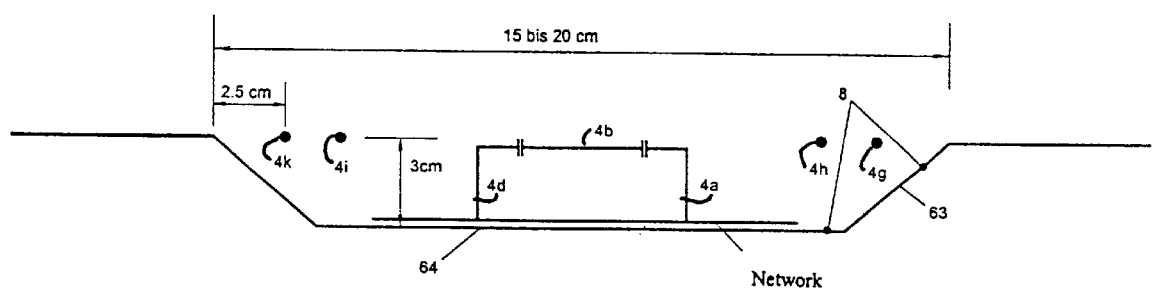

FIG. 10b shows the cross section through the tub-like deepening or trough 58, with the arrangement of the group antennas, and antenna A1. The dimensions shown in the figure apply to a antenna system 1 used at 2.3 GHz. The optimal directional diagram 9 available with one of the group antennas can be obtained through optimal angles of inclination of the slanted tub walls 63, and through the positioning of the horizontally arranged antenna components 4g, 4h, 4i and 4k in the plane of the surface of the body of the vehicle.

Figure 1E:
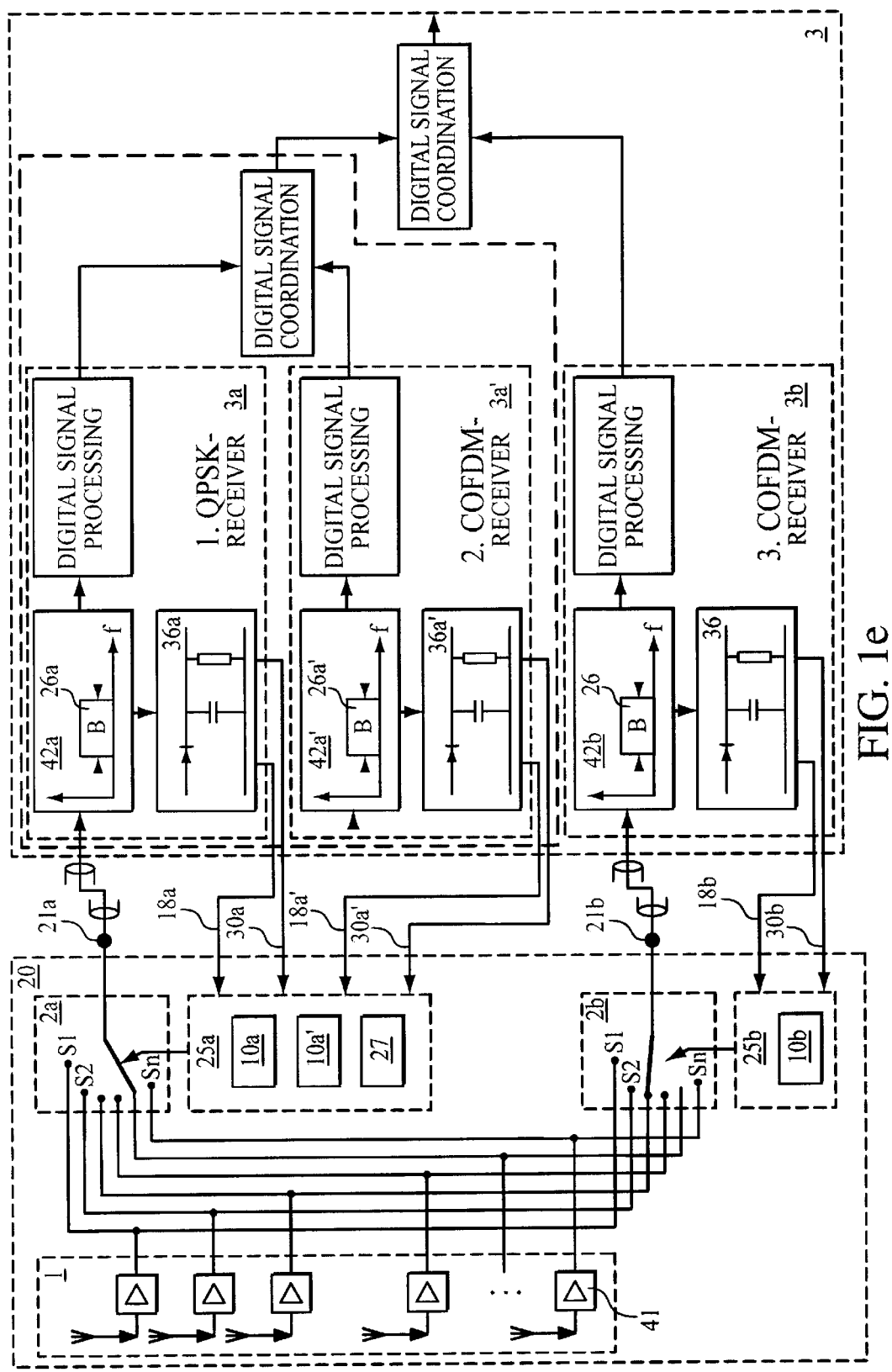
FIG. 1e shows a circuit similar to 1d with a different antenna arrangement.

Especially in the field of automobile building, high-frequency line connections contribute substantially to the overall costs of a receiving system. It is therefore necessary that the expenditure for cables be kept as low as possible. To enhance the reception reliability, in connection with known satellite radio systems, a receiver 3a' can be provided as shown in FIG. 1d, with another reception branch, for signals with QPSK modulation, transmitted by another satellite for the simultaneous and coordinated reception of the radio signals transmitted by the first satellite on a high-frequency band that is close in terms of frequency. The separate HF-ZF components 42a and 42a' are provided (see FIG. 1e) in the receiver for both high-frequency bands, which are supplied with the same signals via a common high-frequency cable 21a between the antenna arrangement 20 and the receivers 3a and 3a'. One high-frequency cable can be saved in this way. To create the diversity function, the reception levels 30a and 30a' are supplied to the reception level testing device 25a, where they each are compared in a level comparator 10 with a threshold value for reliable symbol identification. The binary output signals of both level comparators are supplied to a logic circuit 27, (FIG. 1e) which, via a reversing command addressed to logic circuit device 2a, effects the allocation of another antenna signal, if only one of the two satellite signals is received with a lower-than-required minimum level, for the purpose of reliable symbol identification, i.e. if both threshold values are not exceeded.

In another advantageous embodiment of the invention, logic circuit 27 contains a memory that makes it possible to avoid unnecessary reversals with the help of preceding level tests, if the number of satellite signals received for reliable symbol identification above the minimum level is the same. The system thus is capable of always selecting with minimal switching activity, the one antenna signal with which the greater number of the two satellite signals can be received. This is particularly very advantageous if only two antennas are present in the antenna system 1, such as for example, one in the front area and one in the rear area of the vehicle.

Although the separate selection of the antenna signal most favorable for the reception of each satellite signal is not possible with only one common switching device 2a and one common high-frequency cable, in the case of two antennas, for example, diversity efficiency of two antennas is separately obtained in each case, for each satellite signal.

In another advantageous, further developed embodiment of the invention, the two symbol cycle signals 18a and 18a' are transmitted to the reception level testing device 25a, and supplied there to logic circuit 27. If one of the two satellite signals turns out to be unworthy of reception, the reversing process initiated thereby is changed in another advantageous embodiment of the invention into a reception signal that is worthy of reception, which is initiated at a reversing point that is harmless in terms of time. According to the invention, this reversal thus takes place linked to the symbol cycle of the signal worthy of reception at that moment.

Figure 11A:
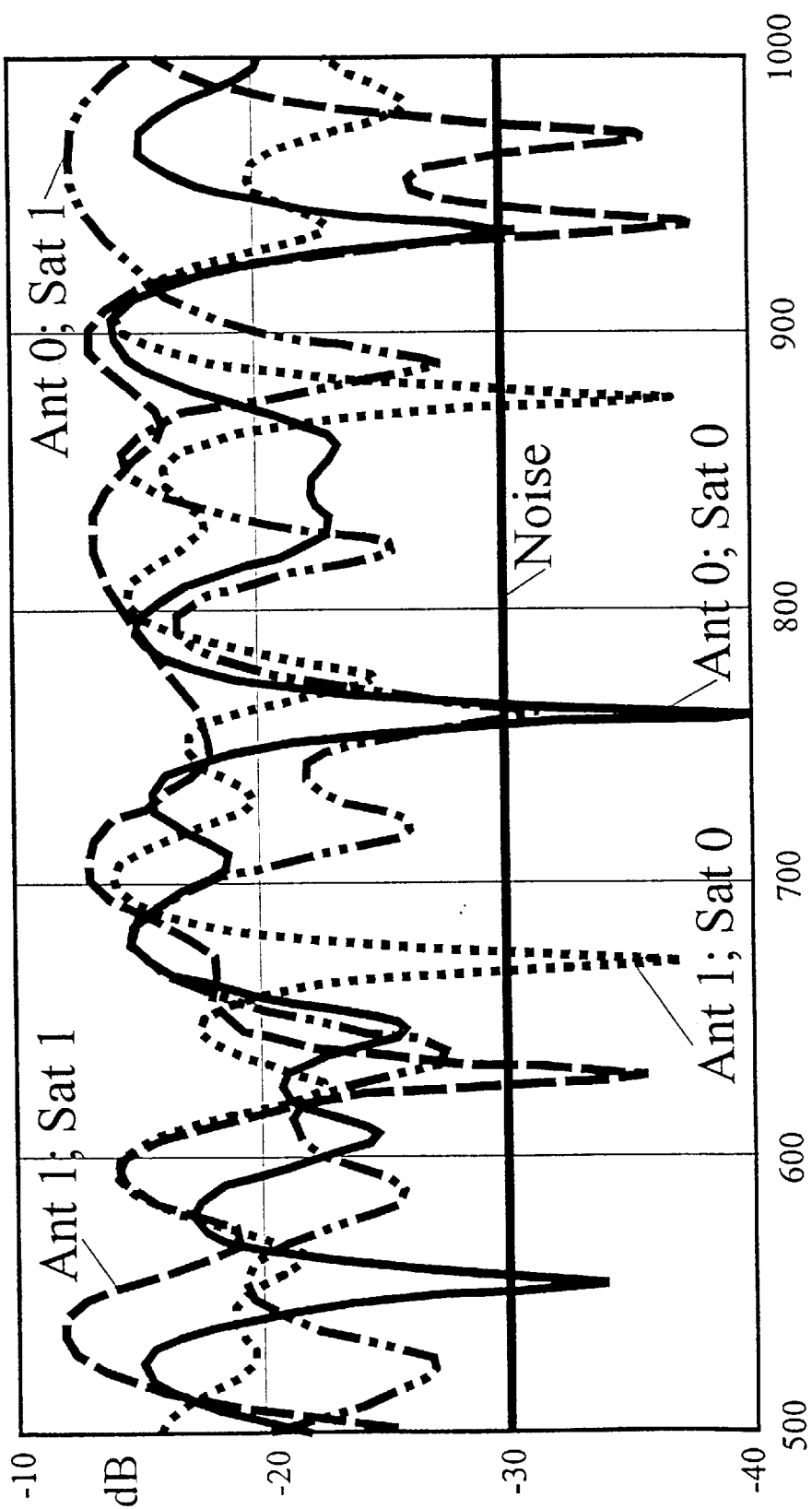
FIG. 11a shows four reception signals in the Rayleigh reception field plotted over distance.

To explain the mode of operation of this system with only two antennas, FIG. 11a shows four reception signals in the Rayleigh reception field plotted over the distance. The curves of these signals denoted by 0 and 1 represent the reception signals of an antenna denoted by 0, and of a satellite denoted by 1. Accordingly, the curves denoted by 2 and 3 represent reception signals of an antenna denoted by 0, and of a satellite denoted by 1. With a corresponding antenna arrangement, the reception signals of both antennas transmitted by a satellite are uncorrelated from each other. Because of the different ways of propagation, the level curves of the two satellite signals of one receiving antenna each are uncorrelated as well. All level curves shown in FIG. 11a thus are uncorrelated and the drops below the minimum reception level (noise in FIG. 11a) required for safe symbol identification largely occur independently of one another.

Figure 11B:
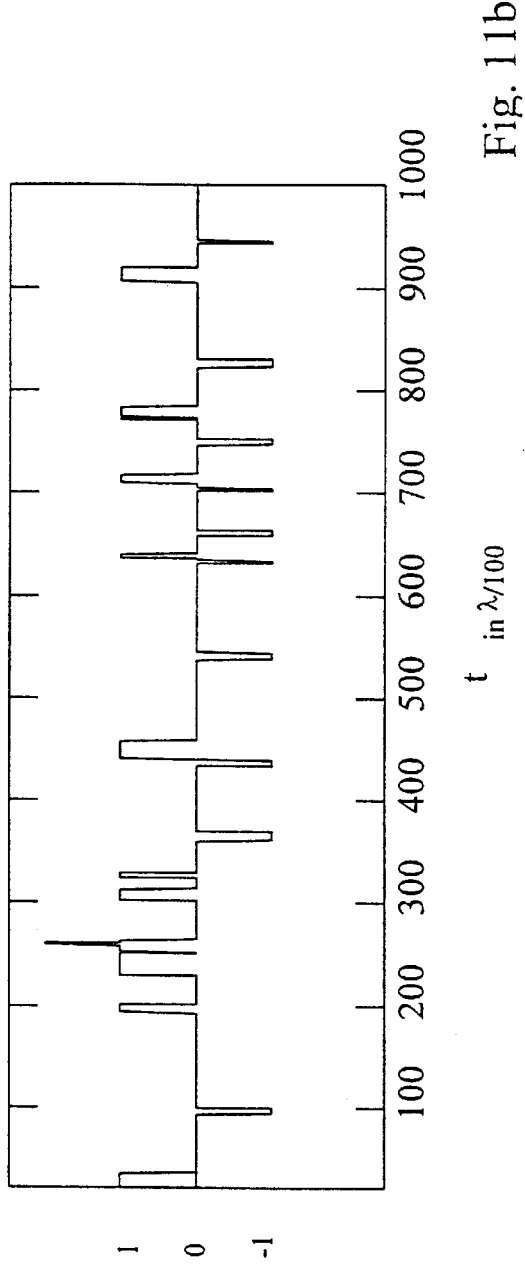
FIG. 11b shows the difference between satellite signals received by antenna 1 vs signals received by antenna 0; and, FIG. 11c shows a curve of the switching function of antenna 1 and antenna 0 over distance.
Figure 11C:
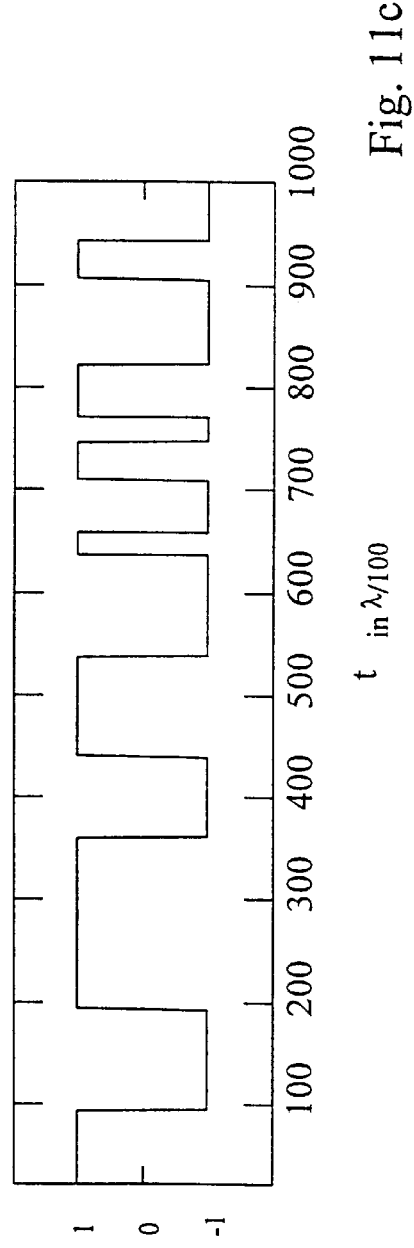

If the number of the satellite reception signals worthy of reception received with the antenna 1 is deducted from the corresponding number of satellite reception signals worthy of reception received with the antenna 0, the curve over the distance shown in FIG. 11b is obtained for this difference. If the logic circuit 27 is designed, for example so that it selects the antenna 0 in points of positive difference values, and the antenna 1 in points of negative difference values, but no further switching of logic circuit device 2a is initiated when the difference is disappearing, the curve of the switched-on antenna shown in FIG. 11c over the distance is obtained, whereby the logic 1 denotes the switch-on of the antenna 0 and the logic −1 denotes the switch-on of the antenna 1. If $p_s$ is the probability for a satellite reception signal for falling short of the required minimum reception level, then one obtains with the diversity efficiency found of n=2 for each signal, a substantially smaller probability for falling short of the required minimum reception level in the diversity operation of $$Pd = Ps^n = Ps^2$$

In another advantageous embodiment of the invention, more than two reception signals, which are emitted on frequency bands that are close to each other, are transmitted only over one high-frequency cable between antenna arrangement 20 and receiver 3a'. Branching of the signals to the various HF-ZF components 42a, 42a', 42b associated with the frequency bands advantageously takes place in the interior of receiver 3. This arrangement can be employed, for example in connection with a satellite radio system with additional terrestrial support, such as the system SDARS in the frequency range around 2.33 GHz. In this an antenna diversity system, the antenna arrangement 20 only contains one switching device 2 with a reception level testing device 25 associated therewith. The latter is supplied both with all of the symbol cycle signals 18a, 18a' and 18b associated with the various frequency bands, and the reception levels 30a, 30a' and 30b. The level comparator and a logic circuit 27 with memories are contained in the latter.

A particular low expenditure of high-frequency cables is achieved with this system, if an arrangement 20 is realized on the vehicle in a confined space, so that feed cables between the gates supplying the various antenna signals and leading to the logic switching device 2 are made as short as possible. These arrangements are shown by way of example in FIGS. 7 to 10b. With the help of the memory present in logic circuit 27, it is possible with the help of the sequentially successive switching positions of logic switching device 2 to test the reception worthiness of all signals received, i.e. of the two satellite signals and the terrestrial signal. Moreover, it is possible at any time to adjust the switching position of logic switching device 2 that results in the greatest number of signals worthy of reception among the three signals to be received. The system adjusts itself in this way dynamically to the reception situation that is constantly changing in the course of driving. Therefore, with the antennas used, it is possible to waive any meticulous adherence to the requirements with respect to the directional diagram of an antenna without antenna diversity for this radio transmission.

Accordingly, while several embodiments of the present invention have been shown and described, it is to be understood that many changes and modifications may be made thereunto without departing from the spirit and scope of the invention as defined in the appended claims.

What is claimed is:

1. A diversity reception system for receiving digitally modulated terrestrial and/or satellite signals in the HF frequency range above 1 GHz for motor vehicles, having an antenna arrangement whose reception signal (5) is supplied to a radio receiver (3), comprising;

the antenna arrangement (20) having an antenna system (1) with a plurality of individual antennas (A1, A2, A3, etc.), and a plurality of antenna components (4a, 4b, 4c, etc.);

a controllable logic switching device (2) having a plurality of discrete switching positions (S1, S2, S3, etc.), and coupled to said individual antennas (A1, A2, A3, etc.) and said antenna components (4a, 4b, 4c, etc.), wherein said individual antennas (A1, A2, A3, etc.) and said plurality of antenna components (4a, 4b, 4c, etc.) are designed and positioned on the vehicle so that at the output (21) of said controllable logic switching device (2) there are provided reception signals (5), that are different in terms of diversity for the discretely available switching positions (S1, S2, S3, etc.) of the controllable logic switching device (2);

a reception level testing device (25) having its input coupled to the receiver (3), for comparatively determining the reception levels of the flow of data contained in the HF channel with the HF channel bandwidth B, wherein said testing device (25) is designed so that when its input is initiated by the symbol cycle (18) generated in the receiver (3) and during the simultaneously occurring symbol identification of the data flow received, the reception level is determined in each case within the shortest possible level testing duration $T_P$ (11), wherein $T_P \approx 1B$;

a level comparator (10) coupled to said testing device (25) wherein the received data flow is successively tested by multiple successive comparative level tests in said level comparator (10) with the help of correspondingly generated reversing signals (23) produced at the output of said testing device and successively supplied to said logic switching device (2), and wherein a favorable reception signal (5) is thereafter selected upon passing through a test cycle, and the test cycle is repeatedly initiated by the reception level testing device (25) with short test cycle time spacings $T_z$, so that within a traveled distance of approximately one half of a wavelength of the high-frequency carrier, the level of the reception signal (5) is adjusted and updated a plurality of times.

2. The reception system according to claim 1, wherein in said discretely available different switching positions (S1, S2, S3, etc.) of said controllable logic switching device (2), provides a reception signal (5) that is favorable in terms of diversity for receiving circularly or linearly polarized waves at said antenna connection point (21).

3. The reception system according to claim 2 for receiving digitally modulated COFDM radio signals with an $N_c \gg 1$ number of sub-carriers (15) with the frequency spacing $f_c$ (16) with M-times PSK modulation and the FDM symbol duration $T_{sf} \approx 1/\Delta f_c$ for the parallel phase identification of the $N_c$ number of sub-carriers (15), wherein the comparative level test of the reception signal (5) receptive to diversity, is carried out over the entire HF channel bandwidth $B=N_c*\Delta f_c$ of all $N_c$ number of sub-carriers together, and the level test duration $T_p$ (11) amounts to about $1/B=1/(\Delta f_c*N_c)$, and is thus selected smaller approximated by the number $N_c$ of the sub-carriers (15) present than the FDM symbol duration $T_{sf} \approx 1/\Delta f_c$ (17), whereby at R, only the time proportion $(R/N_c)*T_{sf}$ insignificant to the symbol identification, is used for the level test within a test cycle for successively testing in time the reception signals (5) to be tested, and the entire test cycle is preferably initiated in each case at the beginning or end of the data flow and preferably with each FDM symbol duration $T_{sf}$.

4. The reception system according to claim 2 for receiving digitally modulated radio signals with only one high-frequency carrier according to the M-PSK method with symbols of the QPSK symbol duration $T_{sp} \approx 1/B$ transmitted serially in time in the frequency range above 1 GHz, wherein in said reception level testing device (25), the level test duration $T_p$ is selected about equal to the QPSK symbol duration $T_{sp} \approx 1/B$, and the reversing signal (23) of the reception level is supplied to the testing device (25) of the logic switching device (2), wherein synchronously with the symbol cycle (18) generated in the receiver (3), a best received reception signal is adjusted by multiple, comparative level tests preferably carried out during the reception of successively following symbols in a level comparator (10) for the identification of the remaining symbols of a group of an $N_c$ number of symbols associated with a test cycle time spacing $T_z$ (8).

5. The reception system according to claim 3 for receiving COFDM radio signals at the frequency of about 2.3 GHz with an $N_c$ number of sub-carriers (15) with the frequency spacing $\Delta f_c=4$ kHz (16) with 4PSK modulation, and the FDM symbol duration $T_{sf} \approx 1/\Delta f_c=250$ μs (17) for the parallel phase identification of the $N_c=1000$ number of sub-carriers (15), wherein the comparative level test of the reception signal (5) receptive to diversity is carried out over the entire HF channel bandwidth $B=N_c*\Delta f_c=4$ MHz (19) of all $N_c=1000$ sub-carriers together, and the level test duration $T_p$ (11) is selected with about $1/B=1/(\Delta f_c*N_c)=0.25$ μs, and thus selected smaller approximated by the number $N_c=1000$ of the sub-carriers (15) present than the FDM symbol duration $T_{sf} \approx 1/\Delta f_c=250$ μs (17), by which up to R=10 sectoral directional diagrams (9) to be tested within a test cycle, the time available for the symbol identification is reduced only by the technically insignificant small time proportion of about $(R/N_c)*T_{sf}=2.5$ μs or together with the reversing durations (24) of about 3 μs, and because of the FDM symbol duration $T_{sf} \approx 1/\Delta f_c=250$ μs at a driving speed of 100 km/h per $\lambda/20$ distance traveled, a complete test cycle is available for selecting a favorable reception signal (5).

6. The reception system according to claim 4 for the reception of radio signals according to the QPSK method with a high-frequency carrier having the frequency of about 2.3 GHz, for the serial phase identification in time of symbols each transmitted with the symbol duration length $T_{sp} \approx 1/B$, wherein the comparative level test of the reception signal (5) favorable in terms of diversity is carried out over the HF channel bandwidth $B \approx 1/T_{sp}=4$ MHz (19), and the level test duration $T_p$ (11) of about $1/B \approx T_{sp} \sim 0.25$ μs, and the test cycle time spacing $T_z$, with an $N_z$ number of associated symbols is selected so that $T_z \approx 250$ μs 1000 symbol time lengths $T_{sp}$ is selected, through which selection a favorable reception signal (5) is adjusted for optimal symbol identification after up to about R=10 reception signals (5) to be comparatively tested successively simultaneously with the symbol identification for the reception of the remaining number of about $N_z-R \approx 990$ of symbols belonging to a group of symbols.

7. The reception system according to claim 1 for the simultaneous and coordinated reception of digitally modulated satellite radio signals enhancing the transmission reliability, according to the M-PSK method and digitally modulated according to the COFDM method, of radio signals transmitted by terrestrial radio stations on neighboring high-frequency bands having the same HF channel bandwidth B in each case of the same signal content offset by the traveling time, with a receiver with separate reception branches according to the superimposition method, and separately available intermediate frequency signals, wherein said reception testing device (25a, 25b), which, in each case, is supplied with the symbol cycle (18a, 18b) of the associated radio service, and said controllable logic switching device (2a, 2b) and an antenna connection point (a, 21b) are available in the antenna system (1) for both functions, and that in the receiver (3), during an FDM symbol duration $T_{sf}$ of the COFDM signal from the parallel data transmission via the terrestrial radio service, and during an equally long symbol group duration $T_{sg}$ of the M-PSK signal from the serial data transmission via the satellite radio channel, data amounts having the same sized content are transmitted and combined in the receiver to a message, and that the test cycle time spacings $T_z$ in the terrestrial reception branch are selected equal to the FDM symbol duration $T_{sf}$ of the COFDM signal, and in the satellite reception branch equal to the symbol group duration $T_{sg}$ of the M-PSK signal, so that a favorable reception signal (5) is separately selected for each radio service.

8. The reception system according to claim 1, for the simultaneous and coordinated, the transmission improving reception of digitally modulated satellite radio signals of a first satellite according to the M-PSK method, and of digitally modulated satellite radio signals of a second satellite according to the M-PSK method, and of digitally modulated radio signals transmitted according to the COFDM method by terrestrial radio stations on neighboring high-frequency bands having the same HF channel bandwidth B in each case of the same signal content, but offset by travelling times, with a receiver having separate reception branches for each of the three radio services, according to the superimposition principle and separately available intermediate frequency signals, wherein said reception level testing device (25a, 25a', 25b), to which the symbol cycle (18a, 18a', 18b) of the associated radio service is supplied, is present for each reception branch, that said controllable logic switching device (2a, 2a', 2b) and said antenna connection point (21a, 21a', 21b) are present in the antenna system (1) for all three radio services; that in the receiver (3), quantities of data each having the same size of their contents are transmitted during an FDM symbol duration $T_{sf}$ of the COFDM signal from the parallel occurring data transmission via the terrestrial radio channel, and during an equally long symbol group duration $T_{sg}$ of the M-PSK signals from the serially occurring data transmission via the two satellite radio channels, and combined in the receiver to a message, and that the test cycle time intervals $T_z$ in the terrestrial reception branch are selected equal to the symbol group duration $T_{sf}$ of the COFDM signal, and in the satellite reception branches selected equal to the symbol group duration $T_{sg}$ of the M-PSK signals, so that reception signals (5) most favorable in terms of diversity are selected separately from one another for each radio service.

9. The reception system according to claim 1, wherein the receiver (3) comprises;
   a bandpass filter (26) with an IF bandwidth equal to the HF channel bandwidth B, and is connected downstream of at least one of the more frequency converters in the intermediate frequency plane; and,
   a reception level indicator (36) coupled to the output signal of said bandpass filter (36) for determining the summarily occurring reception power on said band, and indicating the reception level (30).

10. The reception system for the reception of COFDM signals according to claim 3, wherein said reception level testing device (25) is provided with both the reception level (30) and the symbol cycle signal (18) generated in the receiver (3), comprising;
   a pulse generator (31) coupled to said reception level testing device (25), said pulse generator being triggered by said symbol cycle signal (18) and issuing according to the number R of reception signals (5) to be tested, an accordingly formed pulse sequence whose pulse spacing time consists of the level test times (11) plus the reversing times (24), and wherein said respective pulse sequence is supplied to both the level comparator (10) and the logic switching device (2) for switching on, in a sequential or addressed manner the reception signals (5) favorable in terms of antenna diversity.

11. The reception system according to claim 1 wherein said reception level testing device (25) comprises a sequence control (32), coupled to said symbol cycle signal, a cycle generation for the antenna reversal (33) coupled to said sequence control (32) with the cycle time spacing ≈1/B, a sequentially addressable antenna reversal circuit (34) coupled to said cycle generation (33), a level threshold value transmitter (6), and a level comparator (10) coupled to said sequence control (32) for selecting an adequately powerful reception signal (5) for the identification of the bits transmitted with COFDM signals during an FDM symbol duration $T_{sf}$ (17), or for the identification of the bits transmitted with M-PSK signals during a symbol group duration $T_{sg}$ (12) and that said sequentially addressable antenna reversal circuit (34) is stepped on until said reception level (30) has at least reached the level preset by said level threshold value transmitter (6).

12. The reception system according to claim 3 wherein said reception level testing device (25) comprises a sequence control (32), a cycle generation (33) for the antenna reversal, coupled to said sequence control (32), a sequentially addressable antenna reversal (34) coupled to said cycle generation (33), and a level comparator (10) coupled to said sequence control (32) for selecting the strongest reception signal (5) for the identification of the $N_c*1d(M)$ bits during an FDM symbol duration $T_{sf}$ (17).

13. The reception system according to claim 1 wherein said reception level testing device (25) is disposed in the receiver (3), and that said reversing signals (23) are supplied to said logic switching device (2) of said antenna arrangement (20).

14. The reception system according to claim 1 wherein said reception level testing device (25) is disposed eternally of the receiver (3) within the spatial proximity of said logic switching device (2), and further comprising a high-frequency cable leading to the receiver (3) for providing both the symbol cycle signal (18) and the reception level (30).

15. The reception system according to claim 1, wherein with different levels of the reception signals (5a) derived from the reception signal (5) supplied to the receiver occurring in a series of switching positions (S1, S2, etc) of the logic switching device (2) to be tested, these varying levels are comparatively detected in a reception level testing device (25) so that the maximum level switching position ($S_{max}$) associated with the most favorable reception signal (5), is adjusted at the end of the entire level testing duration (7) for the remaining time of the symbol duration.

16. The reception system according to claim 1 wherein a first antenna (A1) of said antenna system (1) with a specified directional diagram is disposed on a planar surface of the vehicle, whose directional diagram is deformed by recesses, and wherein one or more individual antennas (A2, and, respectively, A2, A3, A4, A5) mounted on the vehicle in a decentralized manner, supply reception signals (5) favorable in terms of diversity, and that the reception signals (5) of all individual antennas (A1, A2, A3, A4, A5) are supplied to said logic switching device (2).

17. The reception system according to claim 1 wherein said antenna system (1) comprises several individual antennas (A1, A2, A3, etc.) and several antenna components (4a, 4b, 4c, . . . 4g) jointly forming a crossed frame antenna arrangement substantially formed by two frame structures, said frame antenna arrangement containing impedance elements (39) and switching diodes (38), whereby in defined discretely available switching positions (S1, S2, S3, etc) of said switching diodes (38), a circularly polarized directional diagram (9) corresponding as closely as possible with the specified directional diagram is adjusted with the help of said impedance elements (39), and that with other discretely available switching positions (S1, S2, S3, etc.) of said switching diodes (38), several sectoral directional diagrams (9) are alternately adjusted for filling the covering surface of said antennas.

18. The reception system according to claim 1 comprising a substantially rectangular deepened tub (58) with slanted tub walls (63) and a flat bottom surface (64) molded into the electrically conductive body of the motor vehicles so that to form a sectoral directional diagram (9) suitable for the steep radiation, a first individual antenna (A1) of said antenna system (1) is mounted in the center of the bottom (64) of said tub, and that for forming additional sectoral directional diagrams (9) covering the angle areas with low elevation, said additional individual antennas (A2, A3, A4, etc.) are mounted on said slanted walls (63) of said tub.

19. The reception system according to claim 18 wherein said first individual antenna (A1) mounted in the center of said tub (58), comprises several individual antennas (A1, A2, A3, etc.) and several antenna components (4a, 4b, 4c, . . . 4g) jointly forming a crossed frame antenna arrangement substantially formed by two frame structures, said frame antenna arrangement containing impedance elements (39) and switching diodes (38), whereby in defined discretely available switching positions (S1, S2, S3, etc) of said switching diodes (38), a circularly polarized directional diagram (9) corresponding as closely as possible with the specified directional diagram is adjusted with the help of said impedance elements (39), and that with other discretely available switching positions (S1, S2, S3, etc.) of said switching diodes (38), a directional diagram (9) as close as possible to the specified directional diagram is defined.

20. The reception system according to claim 1 comprising a substantially round deepened tub (58) with slanted tub wall (63) and a flat bottom surface (64) molded into the electrically conductive body of the motor vehicle so that to form a sectoral directional diagram (9) suitable for the steep radiation, a first individual antenna (A1) of said antenna system (1) is mounted in the center of the bottom (64) of said tub, and that for forming additional sectoral directional diagrams (9) covering the angle areas with low elevation, said additional individual antennas (A2, A3, A4, etc.) are mounted on said slanted walls (63) of said tub.

21. The reception system according to claim 20 wherein said first individual antenna (A1) mounted in the center of said tub (38) comprises a crossed dipole antenna for circularly polarized, steep radiation formed from said antenna components (4a, 4b) disposed in the center of the tub with a suitable spacing from the tub bottom (64) and having at least two group antennas each having a network (62) for switching the antennas together, and formed from the vertical antenna components (4c, 4d, 4e, 4f, and 4g, 4h, 4l, 4k), said at least two group antennas being arranged with a 90 degree angle in relation to one another so as to permit for the purpose of covering the radiation at low elevation angles, the formation of the required sectoral directional diagrams (9) in both directions of their expanse as individual antennas (A2, A3, and A4, A5).

22. The reception system according to claim 21 wherein said at least two group antennas comprises a multitude of group antennas having said individual antennas (A2 to A9) radially disposed on said tub bottom (64) with the same azimuthal angular spacings, for superior covering of the radiation at low elevation angles.

23. The reception system according to claim 21 wherein said individual antennas (A1, A2, A3, etc) additionally comprise horizontally polarized group antennas (A2 to A9) mounted on the slanted wall (63) of said tub, so that each group antenna is spaced apart from each other from said slanted wall (63), and that the number of said antenna components (4g, 4h) etc. is selected adequately high for cancelling or overcompensating the effect of shading by said slanted wall (63) of the tub, said antenna components (4g, 4h, etc.) being disposed opposite one another.

24. The reception system according to claim 23, wherein said group antennas (A2 to A9) are arranged in front of said slanted tub wall (63) in the plane of the surface of the body of the vehicle, with a spacing of approximately one fourth of the wavelength, and the inclination of said slanted tub walls (63) is optimized for radiation at low elevation angles.

25. The reception system according to claim 8, comprising a common high-frequency cable with signal branching for transmitting the two satellite radio signals from said antenna arrangement (20) to the satellite receivers (3a and 3a') on the input of the radio receiver (3); and wherein said logic switching device (2a) for receiving the satellite radio signals, and said reception level testing device (25) are disposed in said antenna arrangement (20), and both the reception levels (30a, 30a') associated with the satellite radio signals, and the two symbol cycle signals (18a, 18a') are supplied to said reception level testing device (25), and further comprising a logic circuit (27) with a memory and coupled to said logic switching device (2a) so as to adjust the switching position of said logic switching device (2a) to receive the greatest number of the satellite signals at any time for a reliable symbol identification.

26. The reception system according to claim 25, wherein said logic circuit (27) containing the memory is designed to step said logic switching device (2a) to another antenna signal in response to the symbol cycle at a reversing point in time, when the reception level falls short of the minimum level, wherein one of the two satellite radio signals is initiated for reliable symbol identification so as to avoid reversing disturbances on the other satellite radio signal worthy of reception and not to substantially damage the reception signal worthy of reception.

27. The reception system according to claim 26 comprising common high-frequency line with signal branching coupled to the input of the receiver (3) for transmitting both the two satellite radio signals and the terrestrial signal from said antenna arrangement (20) to the receivers (3a, 3a' and 3b) of the satellite signals and the terrestrial signal, wherein only one logic switching device (2a) for receiving both the satellite radio signals and the terrestrial signal, and said reception level testing device (25) are present in said antenna arrangement (20), and the reception levels (30a, 30a') associated with the satellite radio signals and the reception level (30b) associated with the terrestrial radio signals are supplied to said reception level testing device (25) for separate level testing, as well as all symbol cycle signals (18a, 18a', 18b), and said logic circuit (27) containing a memory is designed so that by sequentially stepping said logic switching device (2a), the switching position of the logic switching device (2a) in which said device is set at any point in time searches for the greatest number of the signals received for reliable symbol identification.

* * * * *